(12) United States Patent
Takezawa et al.

(10) Patent No.: US 6,935,753 B2
(45) Date of Patent: Aug. 30, 2005

(54) PROJECTOR

(75) Inventors: Takeshi Takezawa, Matsumoto (JP);
Toshiaki Hashizume, Okaya (JP);
Motoyuki Fujimori, Suwa (JP);
Yoshiyuki Yanagisawa, Hagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/399,677

(22) PCT Filed: Jan. 15, 2002

(86) PCT No.: PCT/JP02/00214

§ 371 (c)(1),
(2), (4) Date: Apr. 21, 2003

(87) PCT Pub. No.: WO02/056110

PCT Pub. Date: Jul. 18, 2002

(65) Prior Publication Data

US 2004/0032569 A1 Feb. 19, 2004

(30) Foreign Application Priority Data

Jan. 15, 2001 (JP) .......................................... 2001-6187
May 8, 2001 (JP) ...................................... 2001-137158

(51) Int. Cl.[7] ........................ G03B 21/14; G03B 21/00; G03B 21/16
(52) U.S. Cl. .......................... 353/119; 353/20; 353/31; 353/52; 349/9; 349/58; 349/161
(58) Field of Search ............................. 353/20, 30, 31, 353/33, 34, 37, 52, 56, 57, 58, 60, 61, 98, 99, 100, 119; 359/500, 494, 495, 492, 622, 600; 349/25, 61, 62, 5, 9, 68, 86, 96, 114, 172, 89, 117, 58, 161; 345/97; 250/225; 252/585

(56) References Cited

U.S. PATENT DOCUMENTS

| | | | | |
|---|---|---|---|---|
| 5,473,339 A | * | 12/1995 | Kanatani et al. | 345/87 |
| 5,576,854 A | * | 11/1996 | Schmidt et al. | 349/5 |
| 5,653,522 A | * | 8/1997 | Loucks | 353/122 |
| 5,695,266 A | * | 12/1997 | Kida et al. | 353/31 |
| 5,757,443 A | * | 5/1998 | Kobayashi | 349/5 |
| 6,350,033 B1 | * | 2/2002 | Fujimori | 353/61 |
| 6,359,721 B1 | * | 3/2002 | Fujimori | 359/246 |

FOREIGN PATENT DOCUMENTS

EP 0 646 828 A1 4/1995
JP A 64-28619 1/1989

(Continued)

*Primary Examiner*—Judy Nguyen
*Assistant Examiner*—Rochelle Blackman
(74) *Attorney, Agent, or Firm*—Oliff & Berridge, PLC

(57) ABSTRACT

This invention provides a technique of reducing temperature rise due to heat generation of polarization control elements. A projector includes: an illumination optical system; an electro-optical device for modulating light from the illumination optical system in response to image information; a projection optical system for projecting modulated light obtained with the electro-optical device and a base frame, formed using material including metal material, for mounting a plurality of optical components arranged on an optical path from the illumination optical system to the projection optical system. At least one of the plurality of optical components is a polarization control component that includes: a polarization control element including organic material for the controlling polarization state of light exiting from the polarization control element; and a light-transmissive member having a thermal conductivity of at least about 0.8 W/(m·K), to which the polarization control element is stuck. The light-transmissive member and the base frame are thermally coupled.

28 Claims, 24 Drawing Sheets

FOREIGN PATENT DOCUMENTS

| | | |
|---|---|---|
| JP | A 1-314286 | 12/1989 |
| JP | A 2-163729 | 6/1990 |
| JP | A 4-121781 | 4/1992 |
| JP | A 4-138418 | 5/1992 |
| JP | A 4-142527 | 5/1992 |
| JP | B2 6-14255 | 2/1994 |
| JP | A 6-110040 | 4/1994 |
| JP | A 7-20454 | 1/1995 |
| JP | A 7-64185 | 3/1995 |
| JP | U 7-23330 | 4/1995 |
| JP | Y2 7-55535 | 12/1995 |
| JP | B2 2500741 | 3/1996 |
| JP | A 8-95005 | 4/1996 |
| JP | B2 2513364 | 4/1996 |
| JP | A 8-146378 | 6/1996 |
| JP | A 8-178469 | 7/1996 |
| JP | A 8-194201 | 7/1996 |
| JP | A 9-130713 | 5/1997 |
| JP | A 9-281471 | 10/1997 |
| JP | A 9-284685 | 10/1997 |
| JP | A 9-304835 | 11/1997 |
| JP | A 10-123983 | 5/1998 |
| JP | A 10-254366 | 9/1998 |
| JP | A 10-288812 | 10/1998 |
| JP | A 10-293281 | 11/1998 |
| JP | A 10-319379 | 12/1998 |
| JP | A 11-84350 | 3/1999 |
| JP | A 11-84534 | 3/1999 |
| JP | A 11-109504 | 4/1999 |
| JP | A 11-119182 | 4/1999 |
| JP | A 11-202411 | 7/1999 |
| JP | A 11-231277 | 8/1999 |
| JP | A 11-249120 | 9/1999 |
| JP | A 11-316414 | 11/1999 |
| JP | A 11-337914 | 12/1999 |
| JP | A 11-354963 | 12/1999 |
| JP | A 2000-89361 | 3/2000 |
| JP | A 2000-89364 | 3/2000 |
| JP | A 2000-112022 | 4/2000 |
| JP | A 2000-122025 | 4/2000 |
| JP | A 2000-124651 | 4/2000 |
| JP | A 2000-147472 | 5/2000 |
| JP | 2000-147652 * | 5/2000 ........... G03B/21/00 |
| JP | A 2000-180958 | 6/2000 |
| JP | A 2000-206507 | 7/2000 |
| JP | A 2000-284700 | 10/2000 |
| JP | A 2000-314809 | 11/2000 |
| JP | A 2000-338478 | 12/2000 |
| JP | A 2000-347168 | 12/2000 |

* cited by examiner

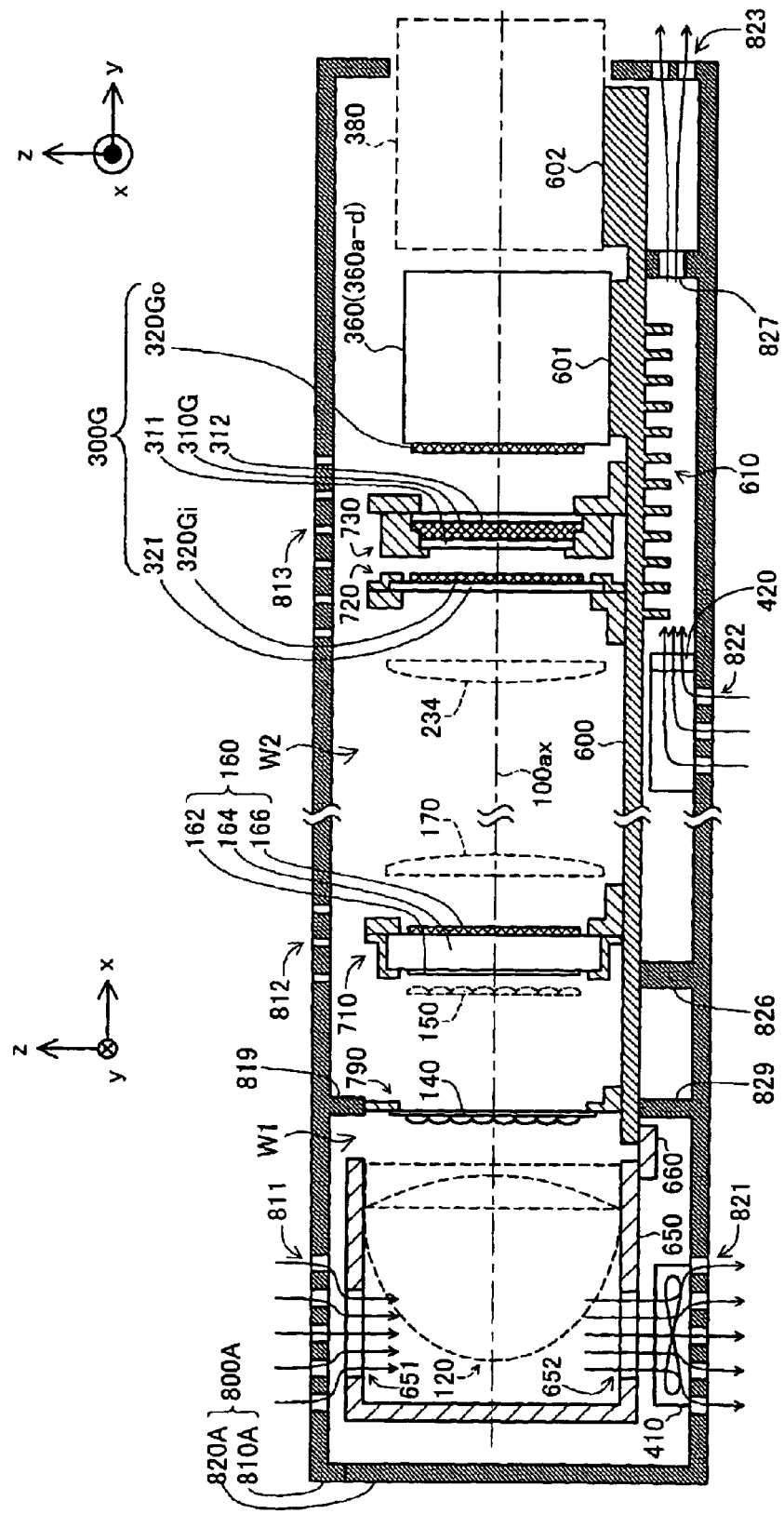

PROJECTOR

TECHNICAL FIELD

This invention relates to a projector for projecting and displaying images.

BACKGROUND ART

Projectors display images by modulating light from an illumination optical system in response to image information (image signal) by means of a liquid crystal panel, and projecting the modulated light onto a screen.

A liquid crystal light valve is typically composed of a liquid crystal panel, and a polarizing plate provided to the light incident side and/or light exiting side thereof The polarizing plate allows transmission of only the component of light in the direction of the polarization axis, and blocks other components of light. Where a polarizing plate includes organic material, the polarizing plate absorbs light other than the light component in the direction of the polarization axis, and thus generates heat. If due to this heat generation the temperature of the polarizing plate rises, distortion and deterioration of the polarizing plate may occur, and optical characteristics may drop. Specifically, the polarizing plate allows transmission of the light component that should not pass through, and blocks the light component that should not be blocked. For this reason, in the past, a cooling fan was used to actively cool the liquid crystal light valve including the polarizing plate.

However, when miniaturizing a projector, it may be difficult to install a cooling fan, or it will be necessary to miniaturize the cooling fan. In such cases, there has been the problem that the polarizing plate cannot be cooled adequately, and the temperature rise of the polarizing plate becomes relatively large.

This problem is common to any optical elements including organic material for controlling the polarization state of light exiting from the optical elements (hereinafter also termed "polarization control elements").

DISCLOSURE OF THE INVENTION

The object of the present invention is thus to solve the drawbacks of the prior art discussed above and to provide, in a projector, a technique of reducing temperature rise due to heat generation of polarization control elements.

At least part of the above and the other related objects is attained by an apparatus of the present invention, which is a projector that includes: an illumination optical system; an electro-optical device for modulating light from the illumination optical system in response to image information; a projection optical system for projecting modulated light obtained with the electro-optical device; and a base frame, formed using material including metal material, for mounting a plurality of optical components arranged on an optical path from the illumination optical system to the projection optical system. At least one of the plurality of optical components is a polarization control component that includes: a polarization control element including organic material for controlling the polarization state of light exiting from the polarization control element; and a light-transmissive member having a thermal conductivity of at least about 0.8 W/(m·K), to which the polarization control element is stuck. The light-transmissive member and the base frame are thermally coupled.

In the apparatus of the present invention, the polarization control element is stuck to the light-transmissive member of relatively high thermal conductivity. Further, the light-transmissive member is thermally coupled to the base frame including a metal material of relatively high thermal conductivity. Therefore, heat generated by the polarization control elements can be transferred to the light-transmissive member and base frame, and as a result, it is possible to reduce the temperature rise due to heat generation of polarization control elements.

Here, a "thermally coupled" state means a state in which heat is relatively easily transferred. Also, the state of the light-transmissive member and base frame being thermally coupled includes a state in which the light-transmissive member and base frame are in mutual contact, or a state in which a member of relatively high thermal conductivity contacting both the light-transmissive member and base frame is interposed.

In the above apparatus, it is preferable that the light-transmissive member has a thermal conductivity of at least about 5.0 W/(m·K). By using this light-transmissive member, the advantage of the present invention becomes prominent.

In the above apparatus, it is preferable that the base frame is made of metal. By so doing, the thermal conductivity of the base frame can be made relatively high, and so it becomes possible to reduce the temperature rise due to the heat generation of polarization control element.

In the above apparatus, the polarization control component may be held by a metal holder that makes contact with the light-transmissive member, and the light-transmissive member and the base frame may be thermally coupled via at least the holder. Even if a metal holder of relatively high thermal conductivity is interposed between the light-transmissive member and the base frame, heat generated by the polarization control element can be transferred to the base frame, and temperature rise due to heat generation of the polarization control element can be reduced. Also, a plurality of members of relatively high thermal conductivity can be interposed between the base frame and the light-transmissive member which is stuck to the polarization control element.

Here, the holder may be fixed to the base frame via an adhesive sheet or adhesive, or by metal welding. Also the light-transmissive member may be fixed to the holder via an adhesive sheet or adhesive. It is preferable that the adhesive sheet or adhesive has relatively high thermal conductivity. In this way, in the case that an adhesive or adhesive sheet of relatively small thickness is interposed between the holder and the base frame, the holder and the base frame are not contacting directly, but are close, so that heat generated by the polarization control element can be transmitted to the base frame. The case where an adhesive sheet or adhesive is interposed between the light-transmissive member and the holder is similar. If the holder and base frame are joined by metal welding, heat generated by the polarization control element can be transferred efficiently to the base frame.

That is, the aforementioned "thermally coupled" state will be a state relatively easy heat transfer, and includes a state in which an adhesive or adhesive sheet of relatively small thickness is interposed between the light-transmissive member and base frame.

In the above apparatus, the holder may include: a fixing section fixed to the base frame; and an attaching section for attaching the light-transmissive member to the fixing section. Here, the fixing section may be fixed to the base frame via an adhesive sheet or adhesive, or by metal welding. Also, the light-transmissive member may be stuck to the fixing section and/or the attaching section via an adhesive sheet or adhesive.

It is preferable that the above apparatus further includes a metal chassis for housing all optical components arranged on the optical path from the illumination optical system to the projection optical system. In this case, it is preferable that the base frame and the chassis are thermally coupled. This arrangement allows heat generated by the polarization control element to be transferred from the base frame to the chassis, so temperature rise due to heat generation of polarization control element can be reduced.

In the above apparatus, it is preferable that the illumination optical system includes a light source device, wherein the light source device and the base frame are thermally insulated. The light source device has relatively large heat emission. Accordingly, by thermally insulating the light source device and the base frame, temperature rise of the base frame due to heat emission by the light source device can be reduced, and as a result heat generated by the polarization control element can be efficiently transferred to the base frame.

Here, a "thermally insulated" state means a state in which heat is relatively difficult to transfer, and includes a state in which an insulating member is interposed between the light source device and the base frame.

The above apparatus may further include a cooling fin, provided on the outside face of the base frame. In this arrangement, the base frame can be cooled, so the heat generated by the polarization control element can be efficiently transferred to the base frame.

In the above apparatus, it is preferable that a film for raising the radiation rate is formed on the outside face of the base frame. In this arrangement, the base frame temperature can be made relatively low, so that temperature rise due to heat generation of polarization control element can be further reduced.

It is also preferable that a film for raising the radiation rate is formed on the outside face of the chassis. In this arrangement, the heat of the chassis can be efficiently radiated to the outside, so that it becomes possible to further reduce temperature rise due to heat generation of polarization control element.

In the above apparatus, the polarization control element may be a liquid crystal panel as the electro-optical device, a polarizing plate, or a retardation plate.

In the above apparatus, the light-transmissive member may be a lens.

Alternatively, the polarization control component may further include a lens, the lens being provided on the plate shaped light-transmissive member. By so doing, compared to the case where the light-transmissive member is a lens, a polarization control component having a lens function can be fabricated relatively easily.

In the above apparatus the lens may be formed of plastic. In this case, lens faces can be fabricated relatively easily.

In the above apparatus, the light-transmissive member may be a sapphire member or a rock crystal member. These members have a relatively high thermal conductivity of at least about 5.0 W/(m·K), so that temperature rise due to heat generation of polarization control element can be reduced.

BRIEF DESCRIPTION OF THE DRAWINGS

FIG. 15 is an explanatory diagram showing a chassis 800A in the Fourth Embodiment;

BEST MODE FOR CARRYING OUT THE INVENTION

Figure 1:
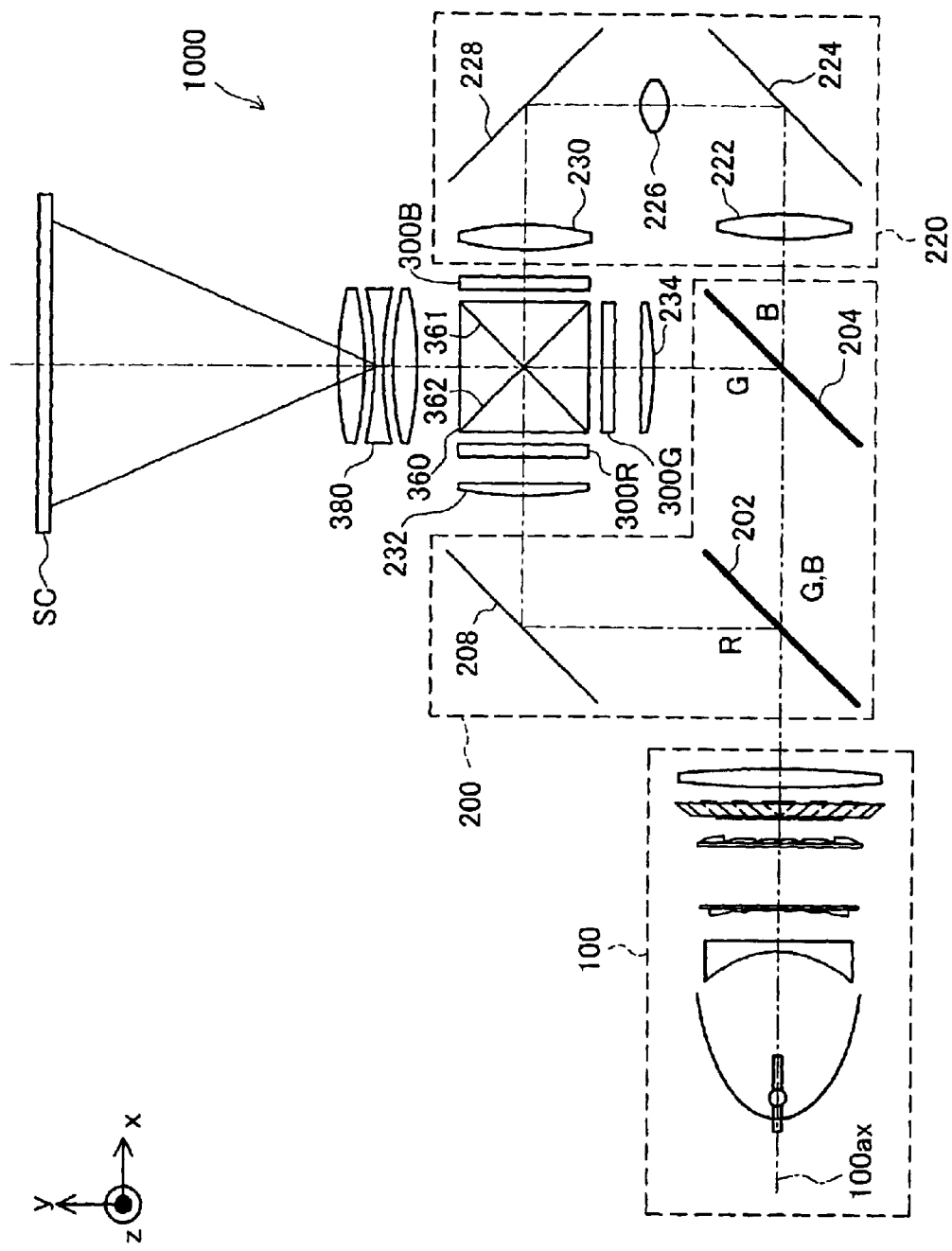
FIG. 1 is a simplified schematic diagram showing an example of a projector.

A. First Embodiment:

One mode of carrying out the present invention is discussed below as a preferred embodiment. FIG. 1 is a simplified schematic diagram showing an example of a projector. Projector 1000 comprises an illumination optical system 100, a color separation optical system 200, a relay optical system 220, three liquid crystal light valves 300R, 300G, 300B, a cross dichroic prism 360, and a projection optical system 380.

Light output from the illumination optical system 100 is separated by the color separation optical system 200 into colored light of the three colors of red (R), green (G) and blue (B). The separated colored lights are modulated by liquid crystal light valves 300R, 300G, 300B in response to image information. Modulated lights are combined by the cross dichroic prism 360, and the composite light is projected onto a screen SC by the projection optical system 380. By means of this an image is displayed on the screen SC.

Figure 2:
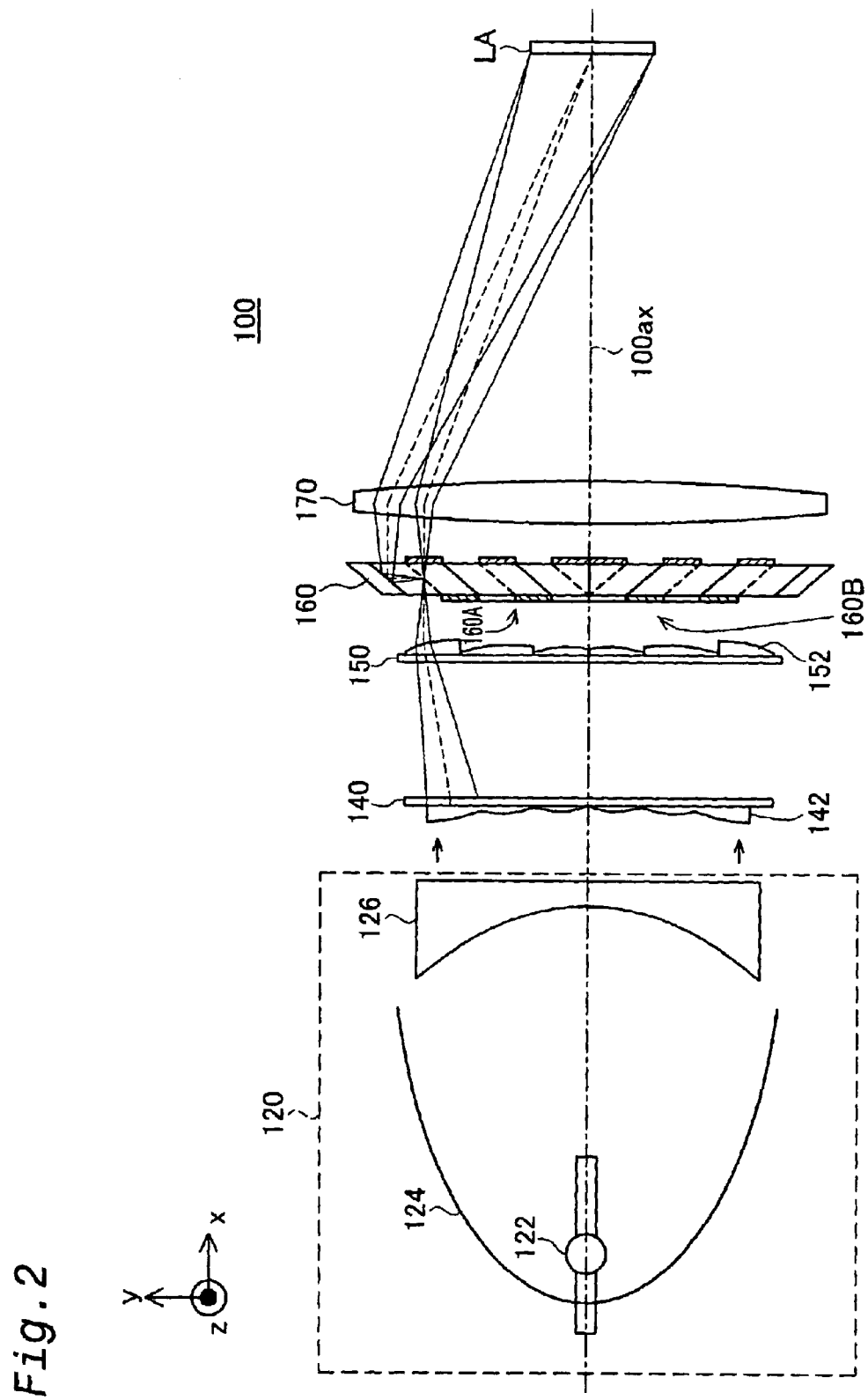
FIG. 2 is an illustrative diagram showing an enlarged view of the illumination optical system 100 of FIG. 1.

FIG. 2 is an illustrative diagram showing an enlarged view of the illumination optical system 100 of FIG. 1. The illumination optical system 100 comprises a light source device 120, first and second lens arrays 140, 150, a polarization generating optical system 160, and a superimposing lens 170. The optical components are aligned along to a system optical axis 100ax. Here, the system optical axis 100ax is the center axis of the beam of light output by light source device 120. In FIG. 2, a lighted area LA illuminated by the illumination optical system 100 corresponds to the liquid crystal light valves 300R, 300G, 300B of FIG. 1.

The light source device 120 comprises a lamp 122, a reflector 124 having a concave face of spheroid, and a parallelizing lens 126. The lamp 122 is situated in proximity to a first focal point of the spheroid of the reflector 124. Light output by the lamp 122 is reflected by the reflector 124, and the reflected light is converged while advancing towards the second focal point of reflector 124. The parallelizing lens 126 converts incident converged light to light substantially parallel to the system optical axis 100ax.

The first and second lens arrays 140, 150 have a plurality of small lenses 142, 152 arrayed in matrix configuration. The first lens array 140 has the function of splitting the substantially parallel light bundle output from the light source device 120 into a plurality of partial light bundles for output. The second lens array 150 has the function of aligning the partial light bundles output from the first lens array 140 so that their center axes are substantially parallel to the system optical axis 100ax. The second lens array 150, together with the superimposing lens 170, has the function of forming the images of small lenses 142 of first lens array 140 into an image on the lighted area LA.

The small lenses 142, 152 are plano-convex decentered lenses whose external shape, viewed from the x direction, is substantially similar to that of the lighted area LA (liquid crystal light valves). As shown in FIG. 2, decenterd lenses having different manners of eccentricity are used for the first small lens 142 and second small lens 152. Specifically, the outermost peripheral small lens 142 of the first lens array 140 is decentered such that the principal ray of a split partial light bundle proceeds on the diagonal with respect to the system optical axis 100ax. The outermost peripheral small lens 152 of the second lens array 150 is decentered such that the principal ray of a split partial light bundle incident on the diagonal with respect to the system optical axis 100ax becomes substantially parallel to the system optical axis 100ax.

Partial light bundles output by the small lenses 142 of the first lens array 140 are, as shown in FIG. 2, via the small lenses of the second lens array 150, converged at a location in proximity thereto, namely, within the polarization generating optical system 160.

The polarization generating optical system 160 comprises two polarizing element arrays 160A, 160B that have been integrated. The polarizing element arrays 160A, 160B are arranged so as to be symmetrical with respect to the system optical axis 100ax.

Figure 3A:
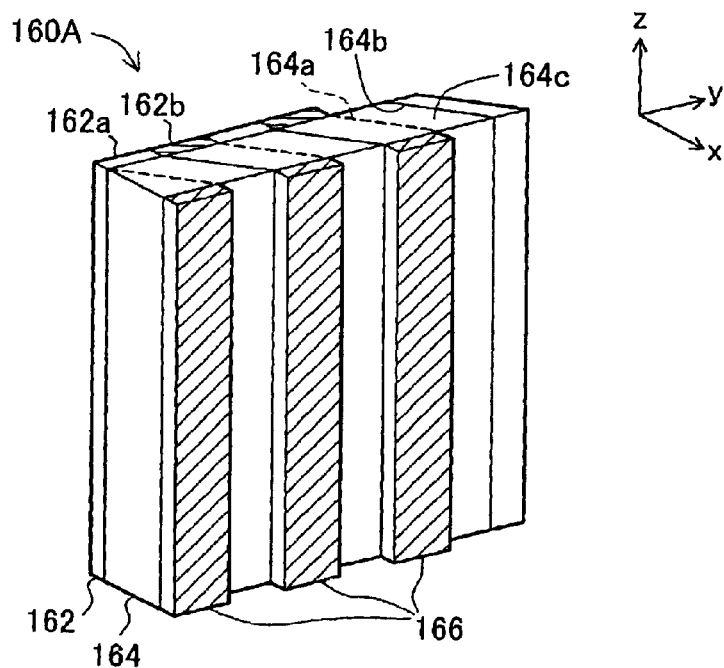
FIGS. 3(A) and 3(B) are illustrative diagrams showing an enlarged view of the first polarizing element array 160A of FIG. 2.
Figure 3B:
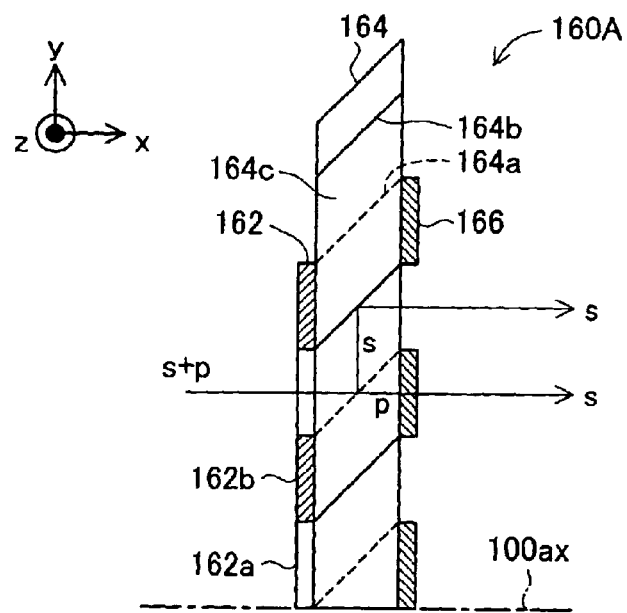

FIGS. 3(A) and 3(B) are illustrative diagrams showing an enlarged view of the first polarizing element array 160A of FIG. 2. FIG. 3(A) is a perspective view of the first polarizing element array 160A, and FIG. 3(B) is a plan view thereof viewed from the +z direction. The first polarizing element array 160A comprises a light blocking plate 162, a polarization beam splitter array 164, and a plurality of $\lambda/2$ retardation plates 166 selectively arranged at the exiting light face of the polarization beam splitter array 164. The second polarizing element array 160B is of similar design.

As shown in FIGS. 3(A) and (B), the polarization beam splitter array 164 is composed of a plurality of columnar light-transmissive members 164c of practically parallelogrammatic cross section, stuck together. Polarization separating films 164a and reflective films 164b are formed alternately at the interfaces of light-transmissive members 164c.

The light blocking plate 162 is composed of open faces 162a and light blocking faces 162b arranged in striped configuration. The open faces 162a and the light blocking faces 162b are provided in association with the polarization separating films 164a and the reflective films 164b respectively. In this way, a partial light bundle exiting from the first lens array 140 (FIG. 2) enters only the polarization separating films 164a of the polarization beam splitter array 164 via the open faces 162a, and does not enter the reflective films 164b.

As indicated by the solid line in FIG. 3(B), the principal ray (center axis) of a partial light bundle exiting from the first lens array 140 (FIG. 2) enters the open face 162a of the light blocking plate 162 in a direction substantially parallel to the system optical axis 100ax. The partial light bundle passing through the open face 162a is separated into an s-polarized partial light bundle and a p-polarized partial light bundle by the polarization separating films 164a. The p-polarized partial light bundle transmits the polarization separating films 164a and is output from the polarization beam splitter array 164. On the other hand, the s-polarized partial light bundle is reflected by the polarization separating films 164a, again reflected off the reflecting film 164b, and then output from the polarization beam splitter array 164. At the light exiting face of the polarization beam splitter array 164, the p-polarized partial light bundle and s-polarized partial light bundle are substantially parallel to each other.

The $\lambda/2$ retardation plates 166 are formed on the light exiting face of the polarization beam splitter array 164, exclusively in the light exiting face of p-polarized light bundles having transmitted through polarization separating films 164a. The $\lambda/2$ retardation plates 166 have the function of converting linearly polarized incident light into linearly polarized light having an orthogonal polarization direction. Thus, a p-polarized partial light bundle is output after being converted into an s-polarized partial light bundle by the $\lambda/2$ retardation plates 166. Thus, a non-polarized partial light bundle (s+p) entering polarizing element array 160A is output after being converted to s-polarized partial light bundles.

As noted, the plurality of partial light bundles exiting the first lens array 140 are separated by the polarization generating optical system 160 into two partial light bundles for each partial light bundle, and converted into substantially a single kind of linearly polarized light having matched polarization direction. The plurality of partial light bundles having matched polarization direction are superimposed on lighted area LA by the superimposing lens 170 of FIG. 2. The light falling on lighted area LA has a substantially uniform intensity distribution.

In this way, illumination optical system 100 (FIG. 1) outputs illumination light of matched polarization direction (s-polarized light), and illuminates liquid crystal light valves 300R, 300G, 300B via the color separation optical system 200 and the relay optical system 220.

The color separation optical system 200 (FIG. 1) comprises two dichroic mirrors 202, 204 and a reflecting mirror 208. This system 200 has the function of separating light output from the illumination optical system 100 into colored light of the three colors red (R), green (G) and blue (B). The first dichroic mirror 202 reflects red colored light R in the light output from the illumination optical system 100, and allows transmission of blue colored light B and green colored light G. The red colored light R reflected by the first dichroic mirror 202 is reflected by the reflecting mirror 208 and then passes through a field lens 232 to enter the liquid crystal light valve 300R for red colored light. The field lens 232 has the function of converting each partial light bundle exiting from the illumination optical system 100 into a light bundle substantially parallel to the system optical axis 100*ax*. The field lenses 234, 230 provided to the other liquid crystal light valves 300G, 300B also function similarly.

Blue colored light B and green colored light G transmitted through the first dichroic mirror 202 are separated by the second dichroic mirror 204. Green colored light G is reflected by the second dichroic mirror 204 and then passes through the field lens 234 to enter the liquid crystal light valve 300G for green colored light. Blue colored light B, on the other hand, transmits through the second dichroic mirror 204 and then enters the relay optical system 220.

Blue colored light B entering the relay optical system 220 passes through an incident side lens 222, first reflecting mirror 224, relay lens 226, second reflecting mirror 228, and exiting side lens (field lens) 230 provided to the relay optical system 220, and enters the liquid crystal light valve 300B for blue colored light. The reason for employing a relay optical system 220 on the optical path of blue colored light B is that the optical path length of the blue colored light B is longer than the optical path lengths of the other colored lights R and G. The use of a relay optical system 220 allows blue colored incident light B on the incident side lens 222 to be transmitted as-is to the exiting side lens 230.

The three liquid crystal light valves 300R, 300G, 300B modulate the three incident colored lights according to given image information (image signal) and generate three modulated lights, respectively. Cross dichroic prism 360 combines the three modulated lights output from the three liquid crystal light valves.

Figure 4:
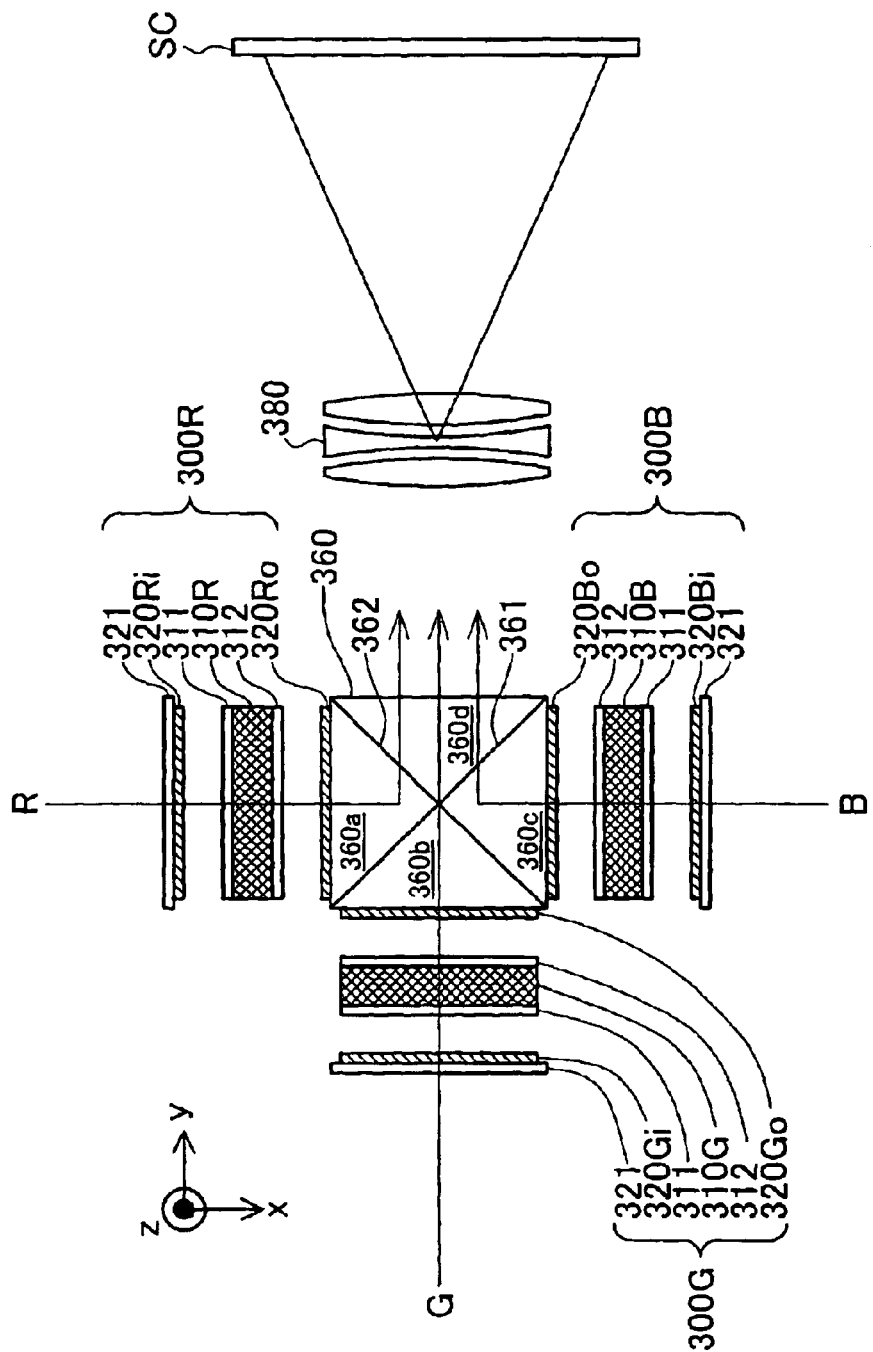
FIG. 4 is an explanatory diagram showing an enlarged view of liquid crystal light valves 300R, 300G, 300B and the cross dichroic prism 360 of FIG. 1.

FIG. 4 is an explanatory diagram showing an enlarged view of liquid crystal light valves 300R, 300G, 300B and the cross dichroic prism 360 of FIG. 1. While the following description emphasizes the second liquid crystal light valve 300G, the other liquid crystal light valves 300R, 300G are also similar.

The second liquid crystal light valve 300G comprises a liquid crystal panel 310G, and two polarizing plates 320Gi, 320Go provided at the light incident side and light exiting side thereof. To the light incident face and light exiting face of the liquid crystal panel 310G are stuck light-transmissive substrates 311, 312. To the first polarizing plate 320Gi provided at the light incident side is stuck a light-transmissive substrate 321. To the second polarizing plate 320Go provided at the light exiting side is stuck the cross dichroic prism 360.

Figure 5:
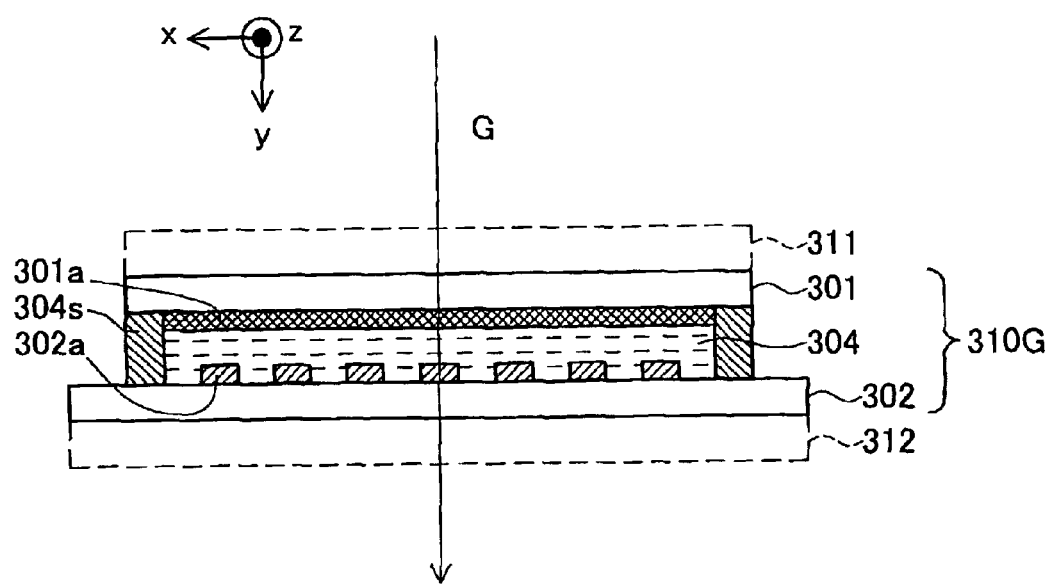
FIG. 5 is a schematic cross section of liquid crystal panel 310G.

FIG. 5 is a schematic cross section of the liquid crystal panel 310G. As shown in the drawing, the liquid crystal panel 310G comprises a pair of glass substrates 301, 302, a liquid crystal layer 304 sandwiched between the pair of glass substrates 301, 302, and a sealing member 304s that prevents leaking out of liquid crystal. On the liquid crystal layer 304 side of the first glass substrate 301 there is formed a transparent common electrode 301a. On the liquid crystal layer 304 side of the second glass substrate 302 there are thin film transistors (not shown) and transparent pixel electrodes 302a, formed per pixel in matrix configuration. As explained in FIG. 4, the light incident face of liquid crystal panel 310G is stuck to the first light-transmissive substrate 311, and the light exiting face is stuck to the second light-transmissive substrate 312.

Colored light G entering the second liquid crystal light valve 300G of FIG. 4 is output by an illumination optical system 100 (FIG. 1) comprising a polarization generating optical system 160, and therefore includes substantially one kind of linearly polarized light. The first polarizing plate 320Gi situated at the light incident side of the second liquid crystal light valve 300G is arranged such that the polarization axis is the same as the polarization direction of incident linearly polarized light. Accordingly, substantially all of the colored light G entering the first polarizing plate 320Gi transmits as-is through the first polarizing plate 320Gi. Polarized light output from the first polarizing plate 320Gi is modulated by the liquid crystal panel 310G. Of the light modulated by the liquid crystal panel 310G, the second polarizing plate 320Go only outputs the light component whose polarization direction is the same as the polarization axis. Modulated light output from the second polarizing plate 320Go (linearly polarized light) enters the cross dichroic prism 360.

The liquid crystal panels 310R, 310G, 310B included in the liquid crystal light valves 300R, 300G, 300B correspond to the electro-optical devices of the present invention.

The cross dichroic prism 360 (FIG. 4) combines the colored light of three colors (modulated light) modulated by liquid crystal light valves 300R, 300G, 300B, to generate composite light representing a color image. The cross dichroic prism 360 is divided by interfaces of roughly X-shaped configuration into four right angle prisms 360a–360d as light-transmissive members. A red colored light-reflective film 361 and a blue colored light-reflective film 362 are formed at the interfaces of the X shape. Reflective films 361, 362 are formed of dielectric multilayer films.

Modulated colored light R (linearly polarized light) output from the first liquid crystal light valve 300R is reflected by the red colored light-reflective film 361 of the cross dichroic prism 360, and modulated colored light B (linearly polarized light) output from the third liquid crystal light valve 300B is reflected by the blue colored light-reflective film 362. Meanwhile, modulated colored light G (linearly polarized light) output from the second liquid crystal light valve 300G transmits through the two reflective films 361, 362 of the cross dichroic prism 360. By means of the red colored light-reflective film 361 and the blue colored light-reflective film 362, the three colored lights are combined to generate composite light representing a color image. For convenience in illustration, in FIG. 4 the locations at which red colored light R and blue colored light B are reflected are shown at locations apart from the two reflective films 361, 362.

The projection optical system 380 projects the composite light exiting the cross dichroic prism 360 onto a screen SC. By means of this, a color image is displayed on the screen SC.

By the way, in projector 1000 of the present embodiment, the λ/2 retardation plates 166 constituting the polarization generating optical system 160 (FIGS. 3(A) and 3(B)) are optical elements that convert incident linearly polarized light into linearly polarized light whose polarization direction is perpendicular, and output it. The first polarizing plates 320Ri, 320Gi, 320Bi and the second polarizing plates 320Ro, 320Go, 320Bo constituting the liquid crystal light valves 300R, 300G, 300B (FIG. 4) are optical elements that output only a predetermined single kind of linearly polarized light. The liquid crystal panels 310R, 310G, 310B constituting the liquid crystal light valves are optical elements that convert the polarization state of linearly polarized light entering the liquid crystal panels in response to image information, and output it. In other words, these optical elements are polarization control elements for controlling the polarization state of light exiting from the polarization control elements. Also, with the polarization control elements of the present embodiment, the control of the polarization state of exiting light is achieved by means of organic material. Thus, when light passes through the organic material, the polarization control elements generate heat. If the temperature of the polarization control elements becomes relatively high, there may be the problems of degraded optical properties or shortened life.

Therefore, in this embodiment, the polarization control elements are stuck to light-transmissive members of relatively high thermal conductivity.

That is, the λ/2 retardation plates 166 are stuck to light-transmissive member 164c. The first polarizing plates 320Ri, 320Gi, 320Bi are stuck to the light-transmissive substrate 321, and second polarizing plates 320Ro, 320Go, 320Bo are stuck to the light-transmissive members (right angle prisms) 360a–360c constituting the cross dichroic prism 360. The liquid crystal panels 310R, 310G, 310B are stuck to the pair of the light-transmissive substrates 311, 312. By sticking polarization control elements to transmissive members of relatively high thermal conductivity in this way, the temperature rise due to heat generation of the polarization control elements can be reduced.

In this embodiment, sapphire members having thermal conductivity of about 42 W/(m·K) are used as the aforementioned light-transmissive members.

Sapphire is a uniaxial single crystal whose axis called the c axis is the optic axis. When linearly polarized light enters such a uniaxial crystal, the polarization state may be changed in some instances due to birefringence. However, if the direction of travel of the linearly polarized light is substantially perpendicular to the optic axis (c axis) and the electrical vector of the linearly polarized light is substantially parallel or perpendicular to the optic axis (c axis), the linearly polarized light is output with substantially no change in polarization state. In this embodiment, as explained in FIGS. 3(A) and 3(B), the polarization generating optical system 160 outputs substantially one kind of linearly polarized light (s-polarized light). The electrical vector of this linearly polarized light oscillates in the z direction in the drawing. Therefore, the optic axes of the sapphire forming the light-transmissive member 164c, the light-transmissive substrate 321, the light-transmissive members (right angle prisms) 360a–360c constituting the cross dichroic prism, and the light-transmissive substrates 311, 312 will preferably be set to the z direction in the drawing, for example. By so doing, linearly polarized light entering the sapphire members will be output with substantially no change in polarization state.

In this embodiment, sapphire members are used as light-transmissive members, but instead rock crystal or the like could be used. Here, "rock crystal" is a single crystal of SiO$_2$, a uniaxial crystal like sapphire. The thermal conductivity of rock crystal is different in the direction parallel to the optic axis (called the z axis) and the direction perpendicular thereto, being about 9.3 (W/(m·K)) in the direction parallel to the optic axis and about 5.4 (W/(m·K)) in the direction perpendicular to the optic axis. In the case that a rock crystal member is used, it will also be preferable to set the optic axis of the rock crystal to the z direction in the drawing, for example. By so doing, linearly polarized light entering the rock crystal members will be output with substantially no change in polarization state. Also, by setting the optic axis of the rock crystal to the z direction in the drawing, the optic axis of the rock crystal will be set to substantially parallel to the surface of the polarization control element. In this case, it will be possible to reduce the temperature rise of the polarization control element, and to make the in-plane temperature distribution of the polarization control element more uniform, as compared to the case where the optic axis of the rock crystal is set to substantially perpendicular to the surface of the polarization control element. This phenomenon is due to differences in thermal conductivity of rock crystal with respect to the optic axis.

In this way, sapphire members, rock crystal members or the like can be used as light-transmissive members. Generally, it is preferable to use light-transmissive members of thermal conductivity of at least about 5.0 W/(m·K).

By the way, the projector 1000 of FIG. 1 actually comprises a chassis, and the optical components are housed in the chassis. Specifically, the optical components are mounted on a base frame, and then housed in the chassis. In this embodiment, in order to further reduce the temperature rise of the polarizing plates and other polarization control elements, particular relationship have been designed between the polarization control components including the polarization control elements, and the base frame and/or chassis.

Figure 6:
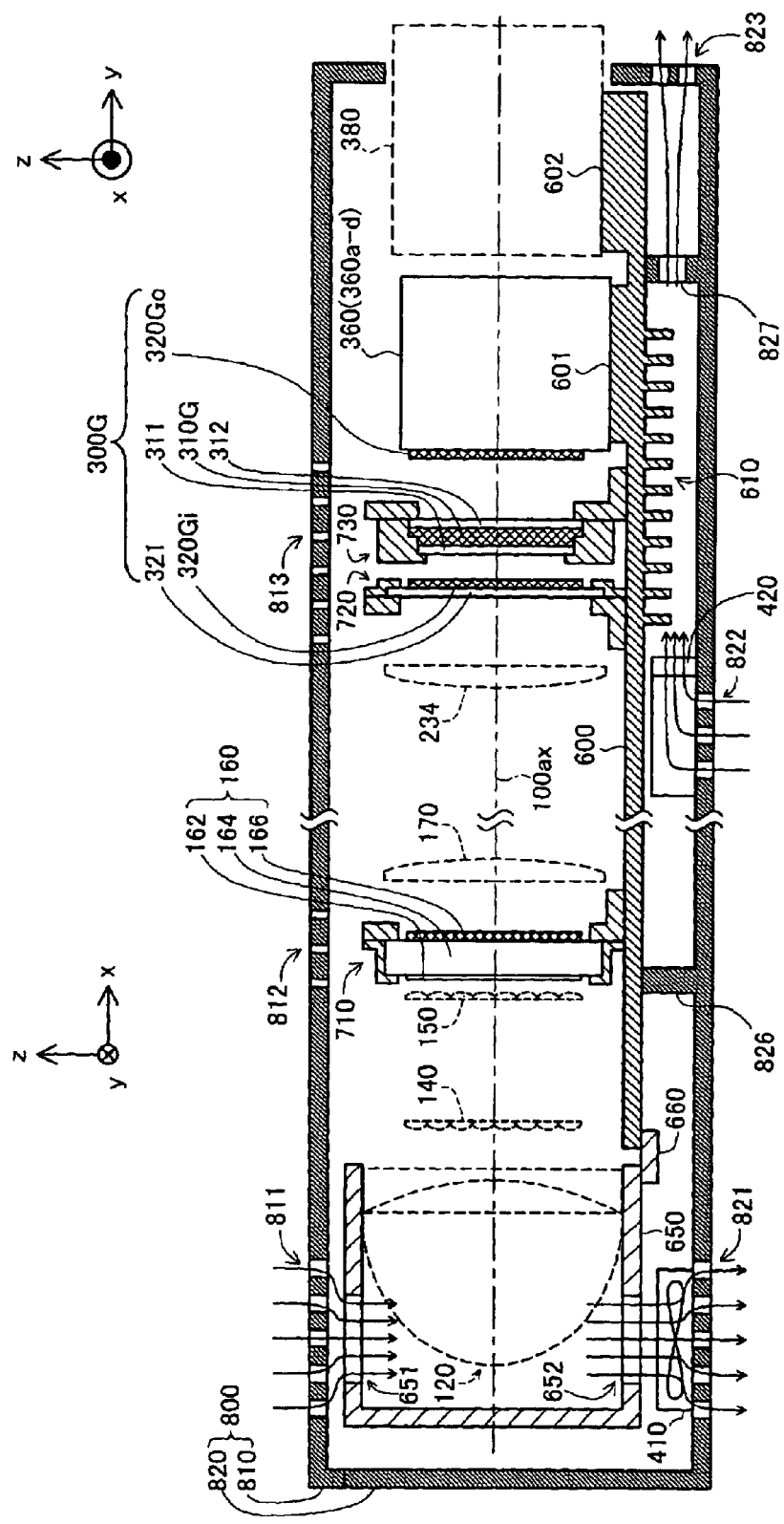
FIG. 6 is a schematic cross sectional view showing the typical base frame 600 and chassis 800 of projector 1000.

FIG. 6 is a schematic sectional view showing a typical base frame 600 and a chassis 800 of projector 1000. As shown in the drawing, the optical components are mounted on the base frame 600, and the base frame 600 is housed in the chassis 800.

In FIG. 6, some of all of the optical components arranged on the optical path from the illumination optical system 100 to the projection optical system 380 shown in FIG. 1 are shown housed in the chassis 800, but actually all of the optical components are housed in the chassis 800. Specifically, the depiction in FIG. 6 focuses on green colored light G, and shows the optical components constituting the illumination optical system 100, the field lens 234, the optical components constituting the second liquid crystal light valve 300G, the cross dichroic prism 360, and the projection optical system 380. Also, in FIG. 6 the polarization control components including polarization control elements 166, 320Gi, 310G, or 320Go are shown with solid lines, and other optical components are shown with broken lines.

All optical components, excluding the light source device 120, are mounted inside the base frame 600. The light source device 120 is mounted in a separately prepared the light source case 650.

The base frame 600 is a frame having a roughly concave cross section defined by side portions and a bottom portion, and its outside shape when viewed from the z direction is a shape enclosing a series of optical components shown in FIG. 1. The bottom portion of the base frame 600 is provided on its top face with two convex portions 601, 602, and on its bottom face with a cooling fin 610. The base frame 600 is integrally molded of metal material.

The cross dichroic prism 360 is mounted on the first convex portion 601, and the projection optical system 380 is mounted on the second convex portion 602. On the bottom portion of the base frame 600, other optical components are mounted via holders. Specifically, optical components are held by holders, and the holders are fixed to the bottom portion of the base frame 600. In this embodiment, the holders, like the base frame 600, are formed using metal material.

In particular, the first polarization control component consisting of the polarization generating optical system 160 only is mounted on the base frame 600 via a first holder 710. The second polarization control component consisting of the first polarizing plate 320Gi and the light-transmissive substrate 321 is mounted on the base frame 600 via a second holder 720. The third polarization control component consisting of the liquid crystal panel 310G and the pair of light-transmissive substrates 311, 312 is mounted on the base frame 600 via a third holder 730. Also, the fourth polarization control component consisting of the second polarizing plate 320Go and the cross dichroic prism 360 is mounted on the base frame 600 by sticking the bottom face of the cross dichroic prism 360 to the first convex portion 601 of the base frame 600.

Figure 7:
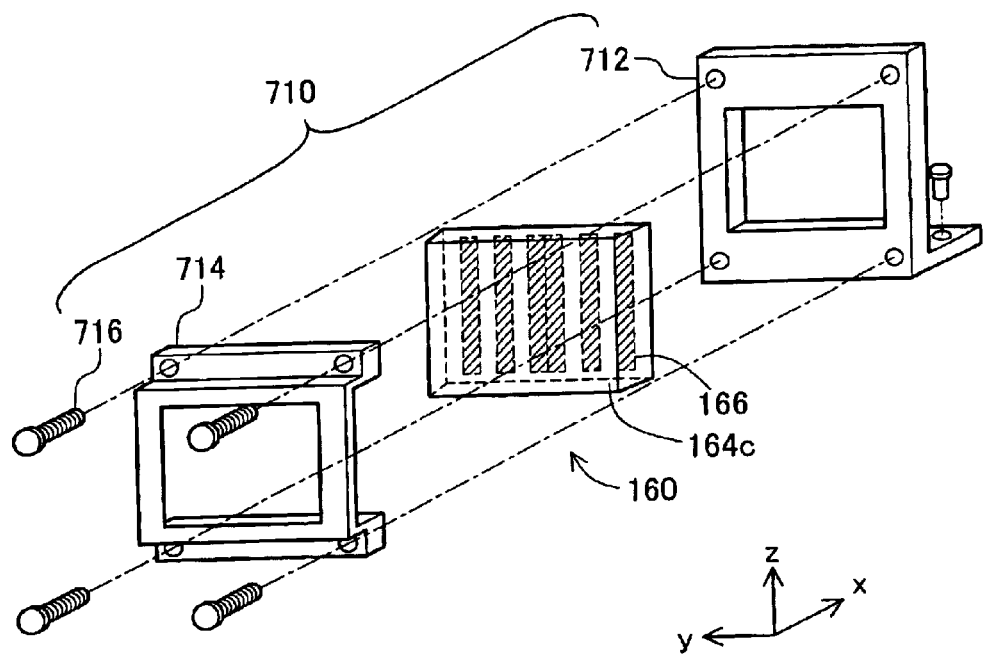
FIG. 7 is an explanatory diagram of the first holder 710 that holds the first polarization control component consisting of polarization generating optical system 160 only.

FIG. 7 is an explanatory diagram of the first holder 710 that holds the first polarization control component consisting of polarization generating optical system 160 only. As shown in the drawing, the holder 710 comprises a fixing section 712 and an attaching section 714. The fixing section 712 has a cross sectional shape of a roughly L-shape, and a roughly rectangular opening on the face through which light passes. The attaching section 714 has a cross sectional shape of a roughly concave shape, and a roughly rectangular opening on the face through which light passes. The fixing section 712 and the attaching section 714 are joined together with the first polarization control component 160 sandwiched between. Specifically, four attachment screws 716 are passed through holes provided in the four corners of attaching section 714, and screwed into female threads provided in the four corners of the fixing section 712, so as to join the fixing section 712 and the attaching section 714. The first holder 710 is then fixed to the base frame 600 by screwing the fixing section 712 onto the base frame 600.

Figure 8:
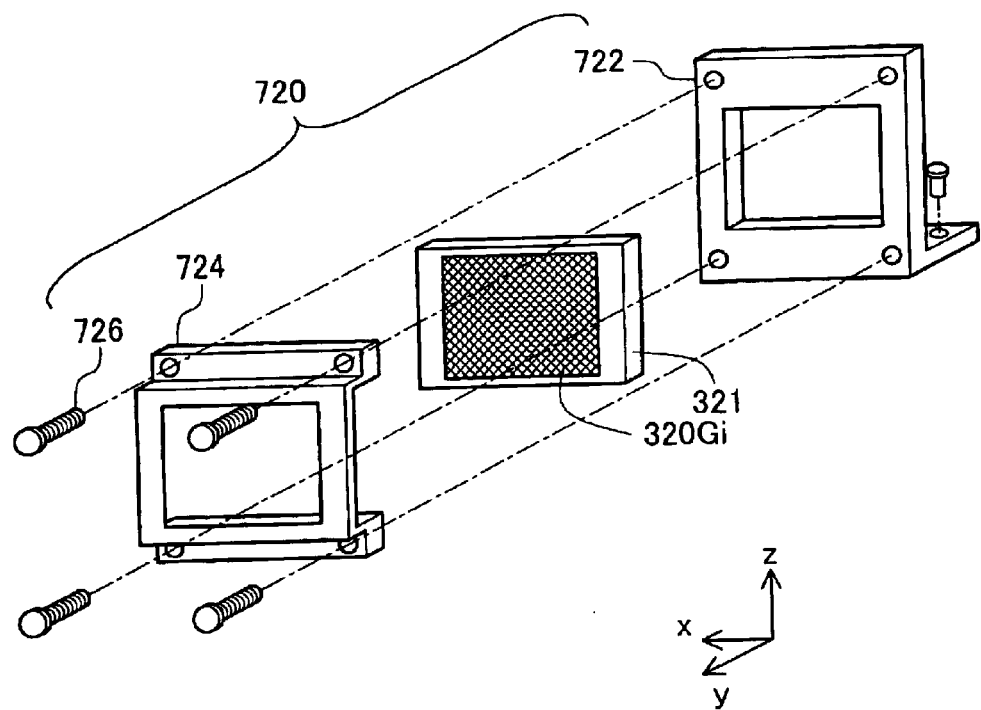
FIG. 8 is an explanatory diagram of the second holder 720 that holds the second polarization control component, consisting of the first polarizing plate 320Gi and the light-transmissive substrate 321.

FIG. 8 is an explanatory diagram of the second holder 720 that holds the second polarization control component consisting of the first polarizing plate 320Gi and the light-transmissive substrate 321. As shown in the drawing, the holder 720 comprises a fixing section 722 and an attaching section 724 similar to FIG. 7. As in FIG. 7, the fixing section 722 and the attaching section 724 are joined together by four attachment screws 726, with the second polarization control component 320Gi, 321 sandwiched between. The second holder 720 is then fixed to the base frame 600 by screwing the fixing section 722 onto the base frame 600.

Figure 9:
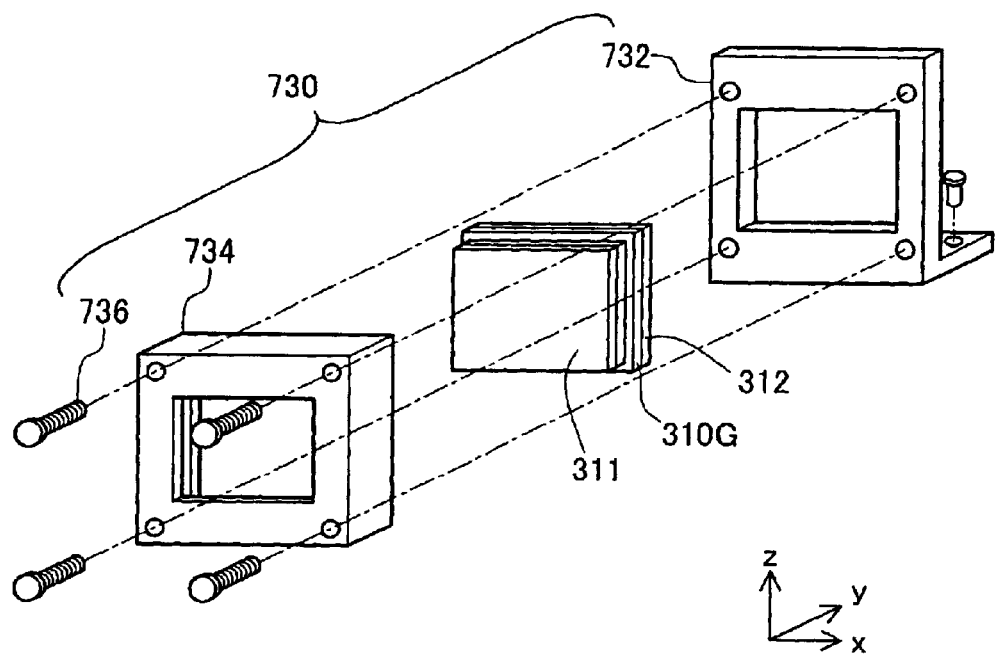
FIG. 9 is an explanatory diagram of the third holder 730 that holds the third polarization control component, consisting of the liquid crystal panel 310G and the pair of light-transmissive substrates 311, 312.

FIG. 9 is an explanatory diagram of the third holder 730 that holds the third polarization control component consisting of the liquid crystal panel 310G and the pair of light-transmissive substrates 311, 312. As shown in the drawing, the holder 730 comprises a fixing section 732 and an attaching section 734. The fixing section 732 is similar to the fixing section 712 in FIG. 7. The attaching section 734 has a frame shape. As in FIG. 7, the fixing section 732 and the attaching section 734 are joined together by four attachment screws 736, with the third polarization control component 310G, 311, 312 sandwiched between. The third holder 730 is then fixed to the base frame 600 by screwing the fixing section 732 onto the base frame 600.

As shown in FIG. 6, all optical components, excluding the light source device 120, are mounted inside the base frame 600 via holders, and the light source device 120 is mounted independently in a light source case 650. Light source case 650 has relatively large holes 651, 652 in its upper portion and lower portion. The light source case 650 is fixed to the base frame 600 via a connector 660. The light source case 650 and the connector 660 are heat insulating members formed using heat insulating material (that is, material of relatively low thermal conductivity).

In the manner described above, optical components are mounted inside the base frame 600, and the base frame 600 is housed in the chassis 800.

The chassis 800 (FIG. 6) is comprised of an upper chassis 810 and a lower chassis 820. The upper chassis 810 and lower chassis 820 are each integrally molded using metal material. The upper chassis 810 is provided in three locations with hole groups 811, 812, 813, the respective hole groups 811, 812, 813 being arranged above the light source device 120, the polarization generating optical system 160, and the liquid crystal light valve 300G. Heat generated by the $\lambda/2$ retardation plates 166 can escape by means of the second hole group 812, and heat generated by the polarizing plate 320Gi, 320Go and the liquid crystal panel 310G can escape by means of the third hole group 813. The lower chassis 820 is also provided in three locations with hole groups 821, 822, 823. The lower chassis 820 is also provided with two convex portions 826, 827 facing to the inside of chassis 800. Actually, more convex portions are provided. The base frame 600 on which the optical components have been mounted is placed on the convex portions 826, 827 of the lower chassis 820 and fixed by screwing on. A gap between the lower chassis 820 and the base frame 600 is formed by the convex portions 826, 827 of the lower chassis 820, and two cooling fans 410, 420 are arranged in the gap. The first cooling fan (axial fan) 410 is arranged below the light source device 120, and the second fan (sirocco fan) 420 is arranged in proximity to below the liquid crystal light valve 300G.

The first cooling fan 410 generates a breeze passing through the hole group 811 provided in the upper chassis 810, the two holes 651, 652 provided in the light source case 650, and the hole group 821 provided in the lower chassis 820. In this way, the light source device 120 can be cooled.

The second cooling fan 420 generates a breeze passing through the hole group 822 provided in the lower chassis 820, a hole provided in the convex portion 827, and the hole group 823. This breeze hits the cooling fin 610 provided on the base frame 600. In this way, the base frame 600 can be cooled efficiently.

As described above, in this embodiment the holders 710, 720, 730 that hold the optical components, the base frame 600, and the chassis 800 are formed using metal material. By so doing, heat generated by the polarization control elements 166, 320Gi, 310G and 320Go in particular can efficiently escape from the chassis.

Specifically, the light-transmissive member 164c to which the λ/2 retardation plates 166 are stuck is held in a state of contact with first holder 710. Similarly, the light-transmissive substrate 321 to which the first polarizing plate 320Gi is stuck is held in a state of contact with second holder 720, and the pair of light-transmissive substrates 311, 312 to which the liquid crystal panel 310G is stuck is held in a state of contact with third holder 730. Thus, heat generated by the three polarization control elements 166, 320Gi, 310G is transferred to the metal base frame 600 via the light-transmissive members 164c, 321, 311, 312 formed of sapphire, and the metal holders 710, 720, 730.

Meanwhile, the cross dichroic prism 360 including the light-transmissive member (right angle prism) to which the second polarizing plate 320Go is stuck is stuck to the first convex portion 601 provided to the base frame 600. Thus, heat generated by the second polarizing plate 320Go is transferred to the metal base frame 600 via the light-transmissive members (right angle prisms) 360a–360d formed of sapphire.

In this way, in this embodiment the light-transmissive members 164c, 321, 311, 312, 360b to which the polarization control elements 166, 320Gi, 310G, 320Go are stuck are thermally coupled to the base frame 600. Thus, it is possible to reduce the temperature rise occurring with heat generation of the polarization control elements.

Also, in this embodiment, the metal base frame 600 contacts the metal chassis 800 via convex portions 826, 827 provided to the lower chassis 820. That is, the base frame 600 and the chassis 800 are thermally coupled. Thus, heat generated by the polarization control elements 166, 320Gi, 310G, 320Go is transferred from the base frame 600 to the chassis 800. In this way, it is possible to reduce the temperature rise occurring due to heat generation of the polarization control elements 166, 320Gi, 310G, 320Go.

Further, as mentioned above, in this embodiment, the light source case 650 and the connector 660 are formed using heat insulating material, so the light source device 120 and the base frame 600 are thermally insulated. Thus, while the light source device 120 per se generates heat markedly, the temperature rise of the base frame 600 due to heat generation of the light source device 120 can be reduced. Further, the light source device 120 is cooled by the first cooling fan 410, so that the surrounding temperature of the light source device 120 can be reduced, and the temperature rise of the base frame 600 can be reduced. By reducing the temperature rise of the base frame 600 due to heat generation of the light source device 120 in this way, heat of the polarization control elements 166, 320Gi, 310G, 320Go can be transferred efficiently to the holders 710, 720, 730, the base frame 600 and the chassis 800. As a result, it is possible to efficiently reduce the temperature rise due to heat generation of the polarization control elements.

Mg alloys or Al alloys may be used, for example, as metal materials to form the holders 710, 720, 730 that hold the optical components, the base frame 600 and chassis 800. UP (unsaturated polyester resin) or PPS (polyphenylene sulfide) may be used, for example, as heat insulating materials to form the light source case 650 and connector 660.

As explained above, the projector 1000 of this embodiment is comprised of polarization control components that include polarization control elements including organic material for controlling polarization state of light exiting from the polarization control components, and light-transmissive members having thermal conductivity of at least about 5.0 W/(m·K), to which polarization control elements are stuck. The projector 1000 is also comprised of a metal base frame 600 on which a plurality of optical components are mounted. The light-transmissive members and the base frame are thermally coupled. By so doing, heat of the polarization control elements can be transferred to the light-transmissive members and base frame, so that it is possible to reduce the temperature rise due to heat generation of the polarization control elements.

It should be noted that, in this specification, "thermally coupled" state means a state in which heat is relatively easily transferred. The state of the light-transmissive member and the base frame being thermally coupled includes a state in which, as with the second polarizing plate 320Go shown in FIG. 6 for example, the light-transmissive members 360a–360d and the base frame 600 are mutually contacted, or a state in which, as with the first polarizing plate 320Gi shown in FIG. 6 for example, a member of relatively high thermal conductivity (holder 720) contacting both the light-transmissive member 321 and the base frame 600 is interposed.

A-1. Modification of First Embodiment:

In the First Embodiment, the fourth polarization control component consisting of the polarizing plate and the cross dichroic prism is fixed to the first convex portion 601 by means of an adhesive sheet or adhesive. As explained in FIGS. 7–9, the first through third polarization control components are fixed to holders by screwing, but instead of this, or in addition to this, they could be fixed to holders by means of an adhesive sheet or adhesive. Specifically, light-transmissive members and fixing sections are joined by means of an adhesive sheet or adhesive, and light-transmissive members and attaching sections are joined by means of an adhesive sheet or adhesive. Also, the holders (fixing sections) holding the first through third polarization control components are fixed to the base frame by screwing, but instead of this, or in addition to this, they could be fixed to the base frame by means of an adhesive sheet or adhesive, or by metal welding.

Material having relatively high thermal conductivity of at least about 0.4 W/(m·K) is preferred as the adhesive sheet, and preferably contains copper or other metal foil. Teraoka Seisakusho Co., Ltd.'s No. 792 (about 0.753 W/(m·K)), No. 7090 (about 0.419 W/(m·K)), for example, may be used as the adhesive sheet.

As the adhesive it is preferable to use one having relatively high thermal conductivity of at least about 0.1 W/(m·K). Dow Corning Toray Silicone Co., Ltd.'s SE4450 (about 1.97 W/(m·K)), Three Bond Co., Ltd.'s No. 3305B, for example, may be used as the adhesive. It is preferable to form the adhesive layer with relatively small thickness, for example, it is preferable to form it with thickness of about 10 $\mu$m or less.

Also, in the case of employing brazing and soldering as metal welding, it is preferably to use flux having a relatively high thermal conductivity of at least about 0.4 W/(m·K). As the flux, solder (about 40–50 W/(m·K)) may be used.

As mentioned above, when an adhesive sheet of relatively small thickness or an adhesive is interposed between a light-transmissive member and a holder (fixing section and/or attaching section), the light-transmissive member and the holder are not directly contacting but are close. Also when an adhesive sheet of relatively small thickness or an adhesive is interposed between a holder (fixing section) and a base frame, the holder and the base frame are not directly contacting but are close. Therefore, in this case as well, heat generated by the polarization control elements can be transferred to the base frame. Also, where a holder and base frame are joined by metal welding, heat generated by polarization control elements can be transferred efficiently to the base frame.

That is, the "thermally coupled" state is a state in which heat being transferred relatively easily, and includes a state in which an adhesive sheet of relatively small thickness or an adhesive is interposed between a light-transmissive member and the base frame.

B. Second Embodiment:

In the First Embodiment, as shown in FIGS. 6 and 8, the first polarizing plate 320Gi, together with the light-transmissive substrate 321, constitutes a polarization control component, but instead of this, the plate 320Gi, together with the field lens 234, may constitute a polarization control component.

Figure 10:
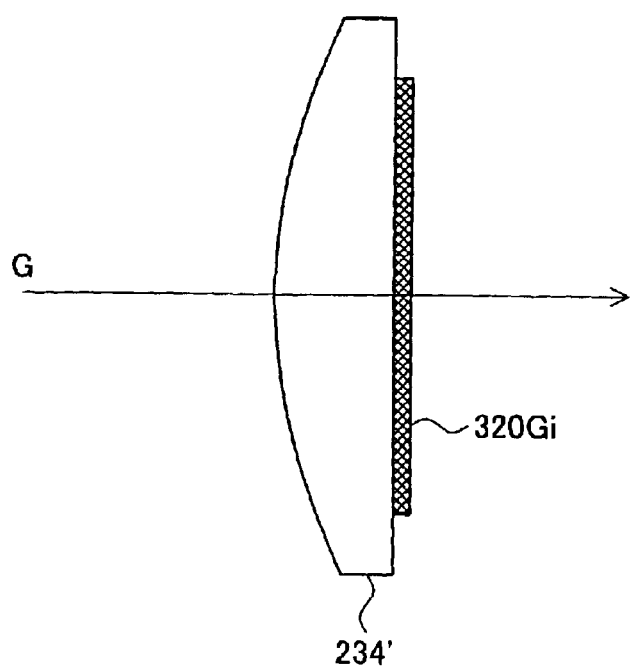
FIG. 10 is an explanatory diagram showing a field lens 234', with the first polarizing plate 320Gi stuck to it.

FIG. 10 is an explanatory diagram showing a field lens 234' with the first polarizing plate 320Gi stuck to it. This field lens 234' is formed of sapphire. As shown in the drawing, the first polarizing plate 320Gi is stuck to the flat face of the plano-convex field lens 234'.

Figure 11:
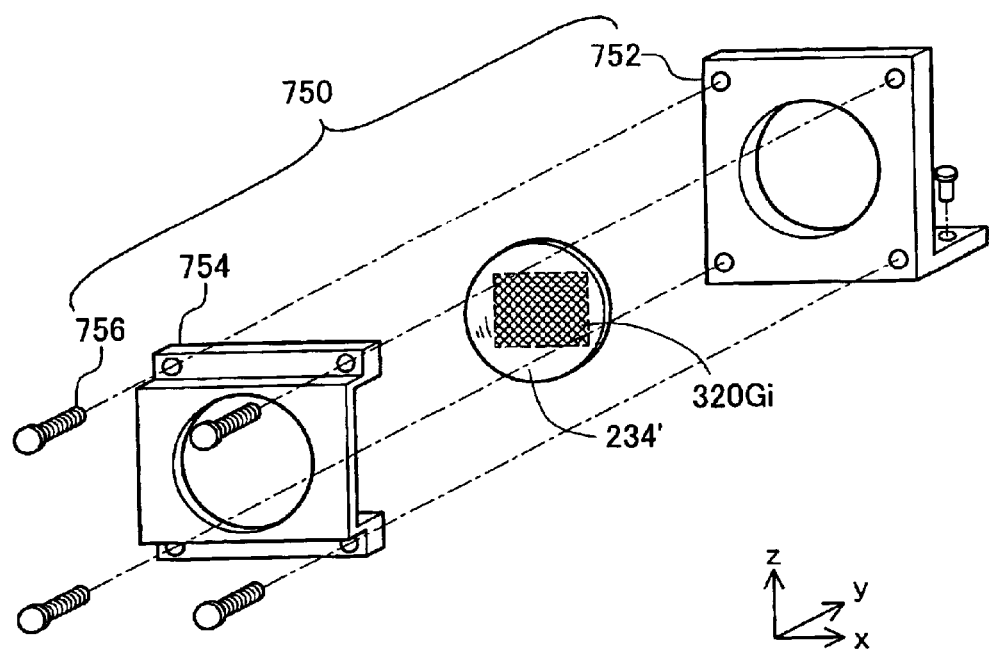
FIG. 11 is an explanatory diagram showing a holder 750 that holds a polarization control component consisting of the first polarizing plate 320Gi and field lens 234' shown in FIG. 10.

FIG. 11 is an explanatory diagram showing a holder 750 that holds a polarization control component consisting of the first polarizing plate 320Gi and the field lens 234' shown in FIG. 10. The holder 750 comprises a metal fixing section 752 and an attaching section 754. The fixing section 752 has a cross sectional shape of a roughly L-shape, and a roughly circular opening on the face through which light passes. The attaching section 754 has a cross sectional shape of a roughly concave shape, and a roughly circular opening on the face through which light passes. As in FIG. 8, the fixing section 752 and the attaching section 754 are joined together by four attachment screws 756, with polarization control component 320Gi, 234' sandwiched between. The holder 750 is then fixed to the base frame 600 by screwing the fixing section 752 onto the base frame 600.

In this embodiment as well, the field lens 234' with the first polarizing plate 320Gi stuck to it is held in a state of contact with the holder 750. Thus, heat generated by the first polarizing plate 320Gi is transferred to the metal base frame 600 via the field lens 234' formed of sapphire, and the metal holder 750. Also, heat generated by the first polarizing plate 320Gi is transferred from the metal base frame 600 to the metal chassis 800.

Even where a polarization control component consists of a first polarizing plate (polarization control element) 320Gi and field lens 234' formed of sapphire in the manner described above, the temperature rise due to heat generation of the first polarizing plate 320Gi can be reduced. Also, in this case the light-transmissive substrate 321 and the holder 720 of FIG. 6 can be omitted.

By the way, in FIG. 10, the field lens 234' is formed of sapphire, and since the hardness of sapphire is relatively high, processing of lens faces is relatively difficult. Therefore, the lens faces of the field lens can be formed using other material.

Figure 12:
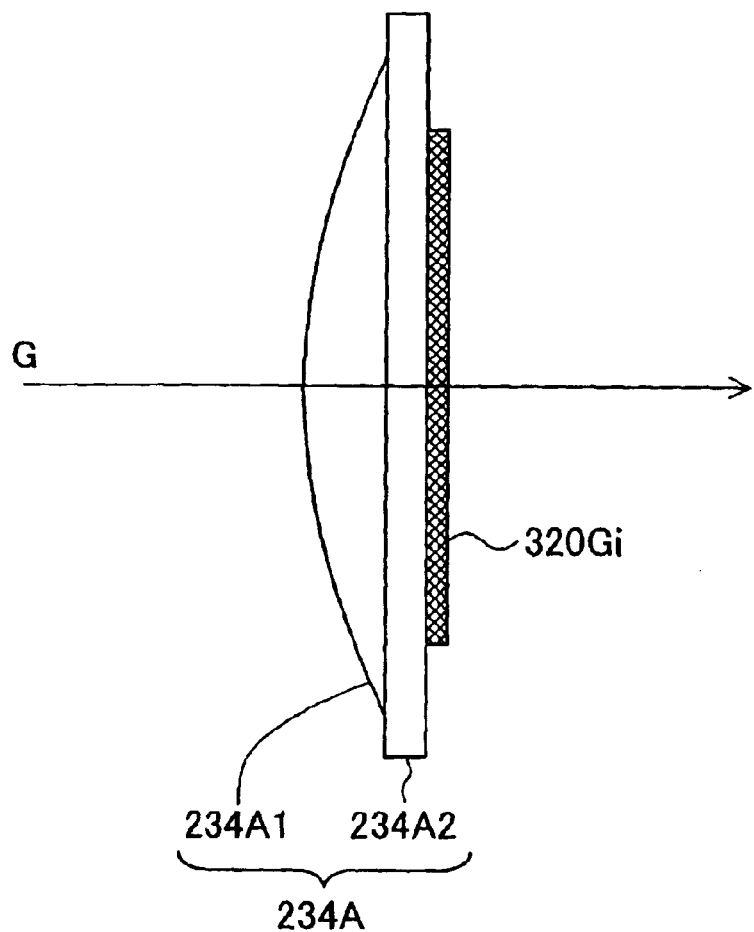
FIG. 12 is an explanatory diagram showing a first modification of a field lens with a first polarizing plate 320Gi stuck to it.

FIG. 12 is an explanatory diagram showing a first modification of a field lens with a first polarizing plate 320Gi stuck to it. As shown in the drawing, this field lens 234A comprises a plastic lens 234A1 and a light-transmissive substrate 234A2 formed of sapphire. The plastic lens 234A1 is obtained by injection molding.

Of the two faces of light-transmissive substrate 234A2, the face contacting the plastic lens 234A1 may have a relatively rough surface. In this case, the irregularity of the rough surface will be filled with adhesive, so that irregular reflection of light by the rough surface can be prevented, and also to increase the bonding strength of the plastic lens 234A1 and the light-transmissive substrate 234A2.

Figure 13:
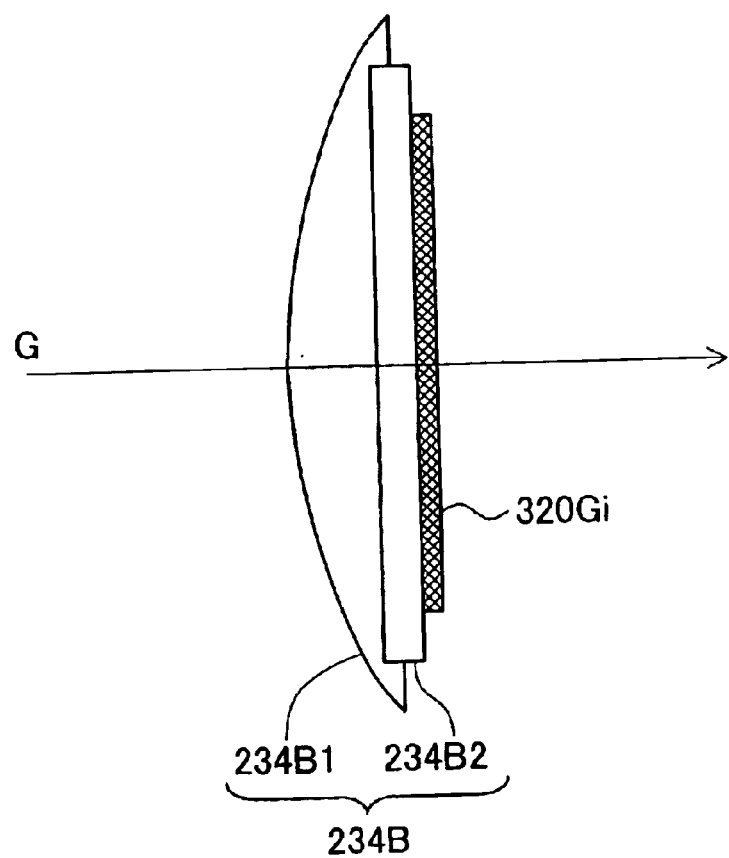
FIG. 13 is an explanatory diagram showing a second modification of a field lens with a first polarizing plate 320Gi stuck to it.

FIG. 13 is an explanatory diagram showing a second modification of a field lens with a first polarizing plate 320Gi stuck to it. As shown in the drawing, this field lens 234B comprises a plastic lens 234B1 and a light-transmissive substrate 234B2 formed of sapphire, as in FIG. 12. However, in FIG. 13, the plastic lens 234B1 is formed so as to envelop one surface of the light-transmissive substrate 234B2. By so doing, the bonding strength of the plastic lens 234B1 and the light-transmissive substrate 234B2 can be further increased.

Even where the field lens 234A, 234B shown in FIG. 12 or FIG. 13 is used, the light-transmissive substrate 234A2 or 234B2 with the first polarizing plate 320Gi stuck to it is held in a state of contact with the holder 750. Thus, heat generated by the first polarizing plate 320Gi is transferred to the metal base frame 600 via the light-transmissive substrate 234A2 or 234B2 formed of sapphire, and the metal holder 750. The heat is then transferred from the metal base frame 600 to the metal chassis 800.

Even where a field lens 234A or 234B of a plastic lens 234A1 or 234B1 provided over a tabular light-transmissive member 234A2 or 234B2 is used, temperature rise due to heat generation of the first polarizing plate 320Gi can be reduced. Also, as compared to the case of using the field lens 234' of FIG. 10, there is no need to form the lens faces of sapphire, which has the advantage of being able to easily fabricate the field lenses 234A, 234B.

With the field lenses 234A, 234B of FIGS. 12 and 13, plastic lenses are used, but glass lenses formed of ordinary glass could be used as well. If a polarization plate is stuck directly onto a plastic lens or glass lens, heat generated by the polarization plate can, in some instances, create temperature non-uniformity in the lens, or produce optical distortion. However, by forming the plastic lens or glass lens on one face of a tabular light-transmissive member formed of sapphire, and sticking the polarizing plate to the other face, it is possible to significantly reduce optical distortion of the plastic lens or glass lens.

B-1. Modification of Second Embodiment:

In the Second Embodiment, as explained in FIG. 11, the polarization control component including the polarizing plate 320Gi is fixed to the holder by screwing, but instead of this, or in addition to this, it could be fixed to the holder by means of an adhesive sheet or adhesive. Also, the holder (fixing section) holding the polarization control component is fixed to the base frame by screwing, but instead of this, or in addition to this, it could be fixed to the base frame by means of an adhesive sheet or adhesive, or by metal welding.

C. Third Embodiment:

In the First Embodiment, as shown in FIGS. 6 and 9, the third polarization control component consisting of the liquid crystal panel 310G and the pair of light-transmissive substrates 311, 312 is held by the holder 730, and the holder 730 is directly fixed to the base frame 600, but the holder could also be fixed to the base frame 600 via some other part.

Figure 14:
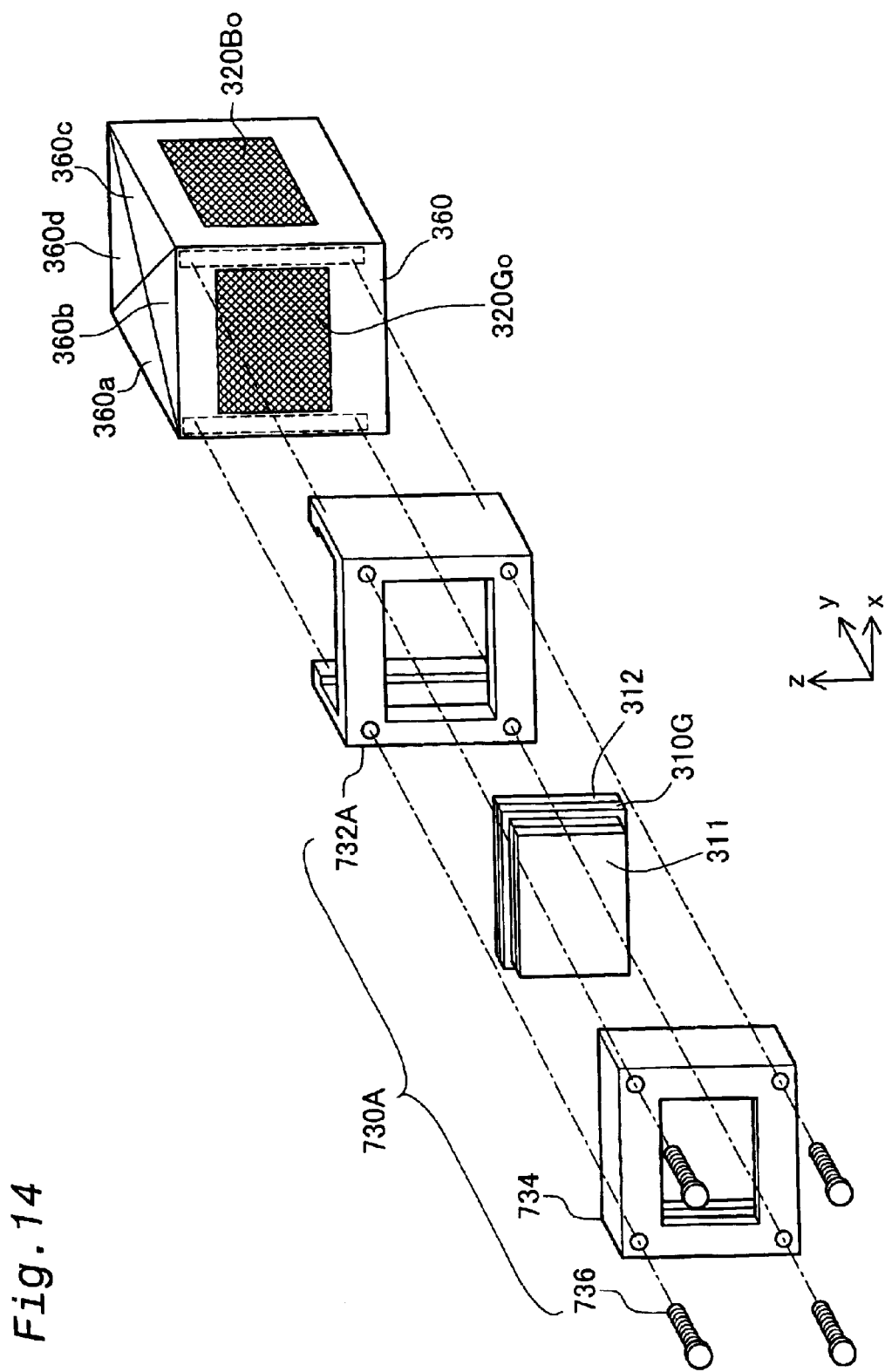
FIG. 14 is an explanatory diagram showing a holder 730A that holds the third polarization control component consisting of liquid crystal panel 310G and a pair of light-transmissive substrates 311, 312.

FIG. 14 is an explanatory diagram showing a holder 730A that holds the third polarization control component consisting of the liquid crystal panel 310G and the pair of light-transmissive substrates 311, 312. The holder 730A is substantially similar to the holder 730 of FIG. 9, but a fixing section 732A is modified. Specifically, the fixing section 732A of this embodiment has two projecting portions.

As explained in FIG. 9, the fixing section 732A and attaching section 734 are joined together with the third polarization control components 310G, 311, 312 sandwiched between. Also, in this embodiment the holder 730A is fixed to the base frame 600 by sticking the holder 730A to the second right angle prism 360b of the cross dichroic prism 360. Specifically, the two projecting portions of the fixing section 734A are stuck at the sides of the polarizing plate 302Go stuck to the second right angle prism 360b.

In this embodiment as well, the pair of light-transmissive substrates 311, 312 with the liquid crystal panel 310G stuck is held in a state contacted with the third holder 730A. Therefore, heat generated by the liquid crystal panel 310G is transferred to the light-transmissive member 360b formed of sapphire, via the light-transmissive substrates 311, 312 formed of sapphire and the metal holder 730A. The heat is then transferred to the metal base frame 600 and the metal chassis 800 via the light-transmissive members 360a–360d formed of sapphire. In this way as well, the temperature rise due to heat generation of liquid crystal panel 310G can be reduced.

As explained above, even if a holder holding a polarization control component is fixed to the base frame via other member of relatively high thermal conductivity, the temperature rise due to heat generation of polarization control element can be reduced. Generally, where a holder is used, the base frame and light-transmissive member to which a polarization control element is stuck will be thermally coupled at least via the holder.

In this way, a "thermally coupled" state of a light-transmissive member and base frame in the present invention includes, for example, a state in which, as with the liquid crystal panel 310G shown in FIG. 14, there is interposed a set of members (specifically, members consisting of the holder 730A and the light-transmissive members 360a–360d formed of sapphire) of relatively high thermal conductivity, contacting both the light-transmissive members 311, 312 and the base frame 600.

D. Fourth Embodiment:

FIG. 15 is an explanatory diagram showing a chassis 800A in the Forth Embodiment. This chassis 800A is substantially similar to the chassis 800 shown in FIG. 6, but is provided with convex portions 819, 829 above and below the first lens array 140. Specifically, a first convex portion 819 facing to the inside of chassis 800A is provided to the upper chassis 810A, and a second convex portion 829 facing to the inside of the chassis 800A is provided to the lower chassis 820A. The first convex portion 819 reaches substantially to the upper edge of holder 790 that holds the first lens array 140, and the second convex portion 829 reaches substantially to the bottom face of the bottom portion of base frame 600.

The holder 790 that holds the first lens array 140 has a cross sectional shape of a roughly L-shape, and is provided with a roughly rectangular opening on the face through which light passes. The first lens array 140 is stuck to the holder 790, and the holder 790 is fixed to the base frame 600.

As shown in the drawing, the interior of the chassis 800 is divided by means of the two convex portions 819, 829, the first lens array 140 and the holder 790 into a first area W1 housing the light source device 120, and another second area W2. By dividing the interior of the chassis 800 into two areas in this way, air heated by the light source device 120 can be prevented from flowing out from the first area WI into the second area W2. Thus, it is possible to further reduce the temperature rise of polarization control elements 166, 320Gi, 310G, 320Go housed in the second area W2.

E. Fifth Embodiment:

In the First Embodiment, as shown in FIG. 6, optical components are held by individually prepared holders, but instead a plurality of optical components could be held by a common holder.

Figure 16A:
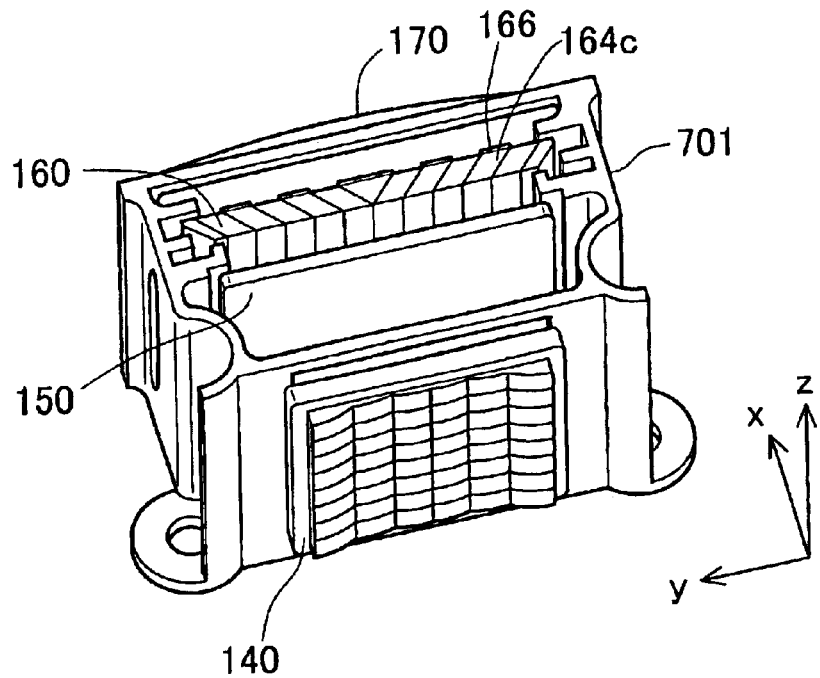
FIGS. 16(A) and 16(B) are explanatory diagrams showing a holder 701 that holds a plurality of optical components included in the illumination optical system 100.
Figure 16B:
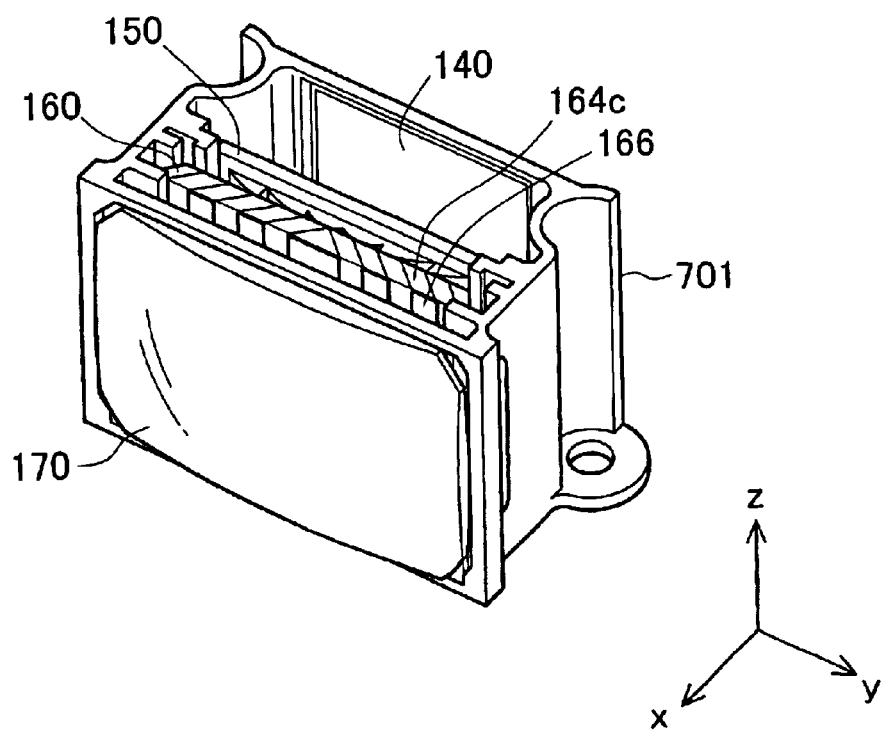

FIGS. 16(A) and 16(B) are explanatory diagrams showing a holder 701 that holds a plurality of optical components included in the illumination optical system 100. The holder 701 is integrally molded using metal material. As shown in the drawing, the holder 701 holds first and second lens arrays 140, 150, a polarization generating optical system 160, and a superimposing lens 170. FIG. 16(A) is a perspective view of the holder 710 when viewed from the first lens array 140 end, and FIG. 16(B) is a perspective view of the holder 710 when viewed from the superimposing lens 170 end.

As shown in FIGS. 16(A) and (B), the holder 701 has an outer shape of substantially cuboid shape, and has an open face through which optical components are inserted into the holder 701 from above (z direction). Also, the light incident face on which the first lens array 140 is mounted and the light exiting face on which the superimposing lens 170 is mounted are provided with openings. On the holder 701, convex portions and concave portions that determine the position of each optical component 140, 150, 160, 170 are formed facing to the inside of the holder 701, extending from the upper face to the lower face of the holder 701. These convex portions and concave portions are provided as pairs on opposing side faces of the holder 701.

In this embodiment as well, the polarization generating optical system 160 including the light-transmissive member 164c to which the $\lambda/2$ retardation plates 166 are stuck is held in a state of contact with the holder 701. Therefore, heat generated by the $\lambda/2$ retardation plates 166 is transferred to the metal base frame 600 via the light-transmissive members 164c formed of sapphire and the metal holder 701. The heat is then transferred from the metal base frame 600 to the metal chassis 800. In this way, even if the holder 701 that holds in common a plurality of optical components is used, the temperature rise due to heat generation of the polarization control elements 166 can be reduced.

In this embodiment, the case of a plurality of optical components included in the illumination optical system 100 being held by a common holder was described, but another plurality of optical components could be held by another common holder.

Also, in this embodiment, polarization control components including the $\lambda/2$ retardation plates 166 are fixed to the common holder 710 by means of an adhesive sheet or adhesive. Also, in this embodiment, the common holder is fixed to the base frame by screwing, but instead of this, or in addition to this, it could be fixed to the base frame by means of an adhesive sheet or adhesive, or by metal welding.

Figure 17:
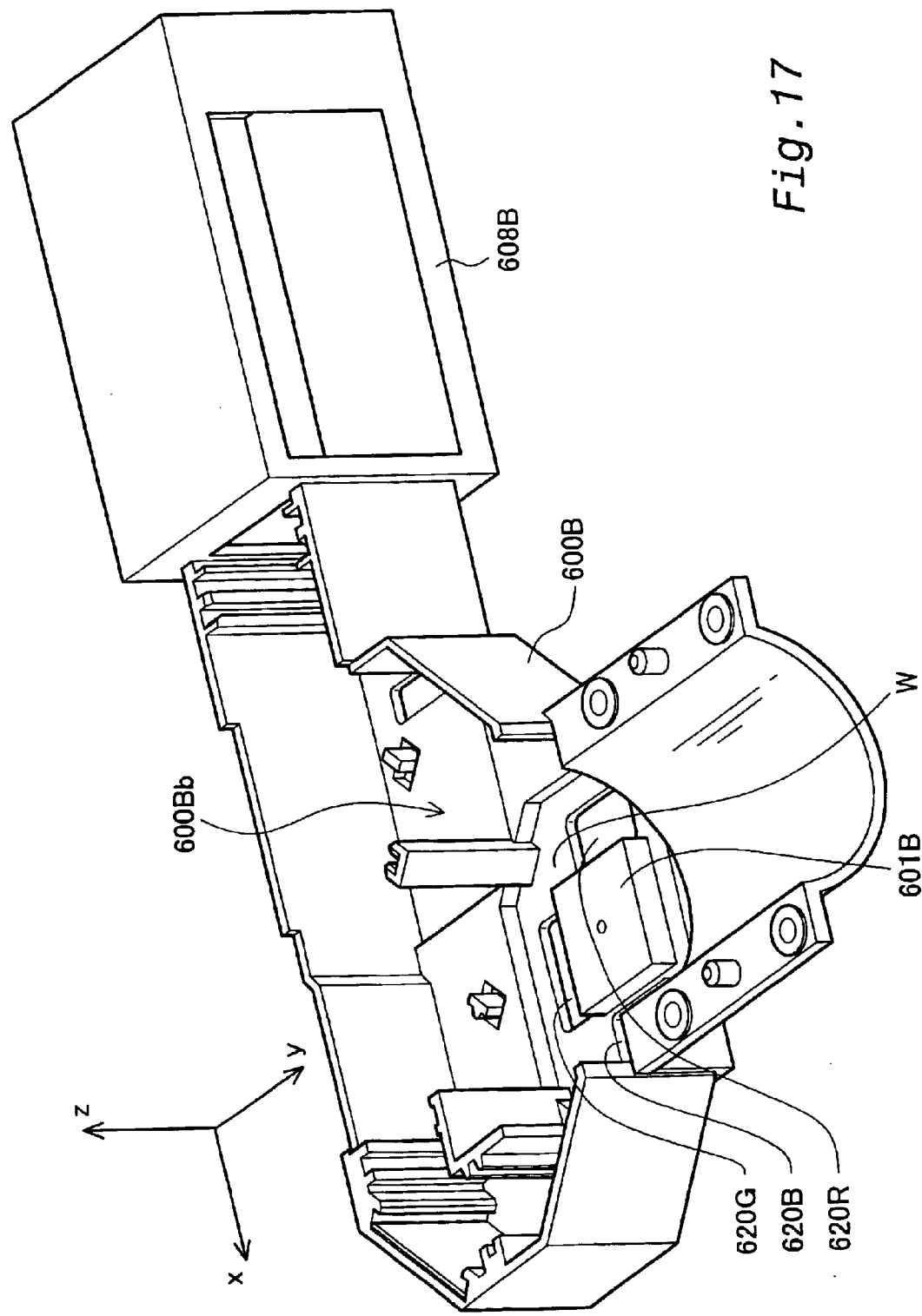
FIG. 17 is a simplified perspective diagram showing a base frame 600B on which optical components of the projector will be mounted in the Sixth Embodiment.

F. Sixth Embodiment:

FIG. 17 is a simplified perspective diagram showing a base frame 600B on which optical components of projector will be mounted in the Sixth Embodiment. The Base frame 600B, like the base frame 600 in the First Embodiment (FIG. 6), has a shape so as to enclose the series of optical components shown in FIG. 1. However, unlike the base frame 600 of the First Embodiment, the base frame 600B of this embodiment comprises in the end portion thereof a light source mounting section 608B having an outer shape of substantially cuboid shape. The base frame 600B including the light source mounting section 608B is integrally molded using metal material of relatively high thermal conductivity (for example, Mg alloy having thermal conductivity of about 156 W/(m·K) or Al alloy having thermal conductivity of about 237 W/(m·K)). The base frame 600B, excluding the light source mounting section 608B, has an open face at the upper face thereof, but the light source mounting section 608B has an open face at the lower face thereof The inside face of the side portions of the base frame 600B has convex portions for mounting optical components.

On the inside face (upper face) of the bottom portion 600Bb of the base frame 600B projects up a column shaped portion having concavities and convexities, in which optical components are mounted. Also, the inside face of the bottom portion 600Bb of base frame 600B is provided with a convex portion 601B for mounting a cross dichroic prism. At a peripheral side of the convex portion 601B is formed a relatively low area W, and in this area W three relatively large roughly rectangular holes 620R, 620G, 620B are formed.

Figure 18:
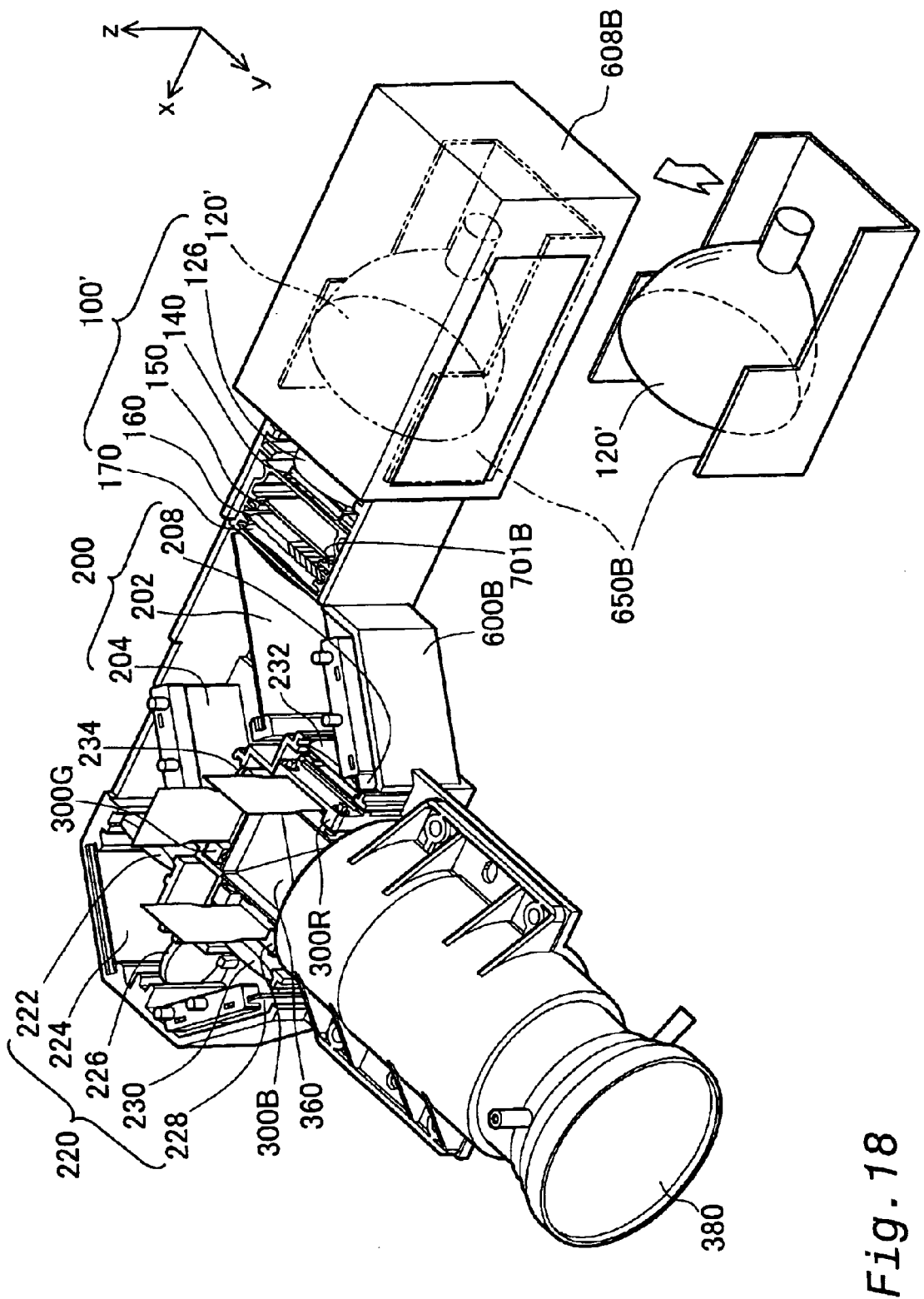
FIG. 18 is a simplified perspective diagram showing the base frame 600B on which the optical components of projector have been mounted.

FIG. 18 is a simplified perspective diagram showing the base frame 600B on which the optical components of projector have been mounted. As shown in the drawing, the base frame 600B has mounted thereon various optical components that make up the illumination optical system 100', the color separation optical system 200, the relay optical system 220, the liquid crystal light valves 300R, 300G, 300B, the cross dichroic prism 360, the projection optical system 380 etc.

As explained in FIG. 2, in the illumination optical system 100 of the First Embodiment, the light source device 120 is comprised of a lamp 122, a reflector 124 and a parallelizing lens 126, but in the illumination optical system 100' of this embodiment, light source device 120' is comprised of a lamp 122 and a reflector 124 only.

The light source device 120' is housed in a light source case 650B having a roughly concave cross section defined by side portions and a bottom portion, and then mounted inside the light source mounting section 608B. Also, the parallelizing lens 126 is mounted directly on the base frame 600B, and the illumination optical system 100' excluding the light source device 120' and the parallelizing lens 126 is mounted on the base frame 600B, in a state held by the holder 701B as shown in FIGS. 16(A) and 16(B).

The light source case 650B, as in the First Embodiment, is formed of a heat insulating material having relatively low thermal conductivity (for example, the above-mentioned UP or PPS). However, in this embodiment, the upper face of light source case 650B is an open face. Because of this, heat of the light source device 120' is relatively easily transferred to the light source mounting section 608B of the base frame 600B. Thus, in this embodiment, the inside wall of the light source mounting section 608B is provided with a heat insulating member (not shown). A member having thermal conductivity of no more than about 0.1 W/(m·K) is preferred to be used as the heat insulating member, for example, a heat insulating member formed of ceramic material or silicone type forming material can be used. As ceramic materials, ceramics and ceramic composite materials (such as composite materials of ceramic fibers and rock wool and alumina fibers and carbon fibers) can be used. As silicone type forming materials, silicone rubber or silicone sponge can be used. The inside wall of light source mounting section 608B can also be coated with ceramic film. Generally, the heat insulating member will be arranged in the space between the light source device and the base frame. By so doing, the light source device 120' and the base frame 600B can be thermally isolated, so temperature rise of the base frame due to heat generation of the light source device can be reduced. As a result, heat generated by the polarization control elements can be efficiently transferred to the base frame.

Figure 19:
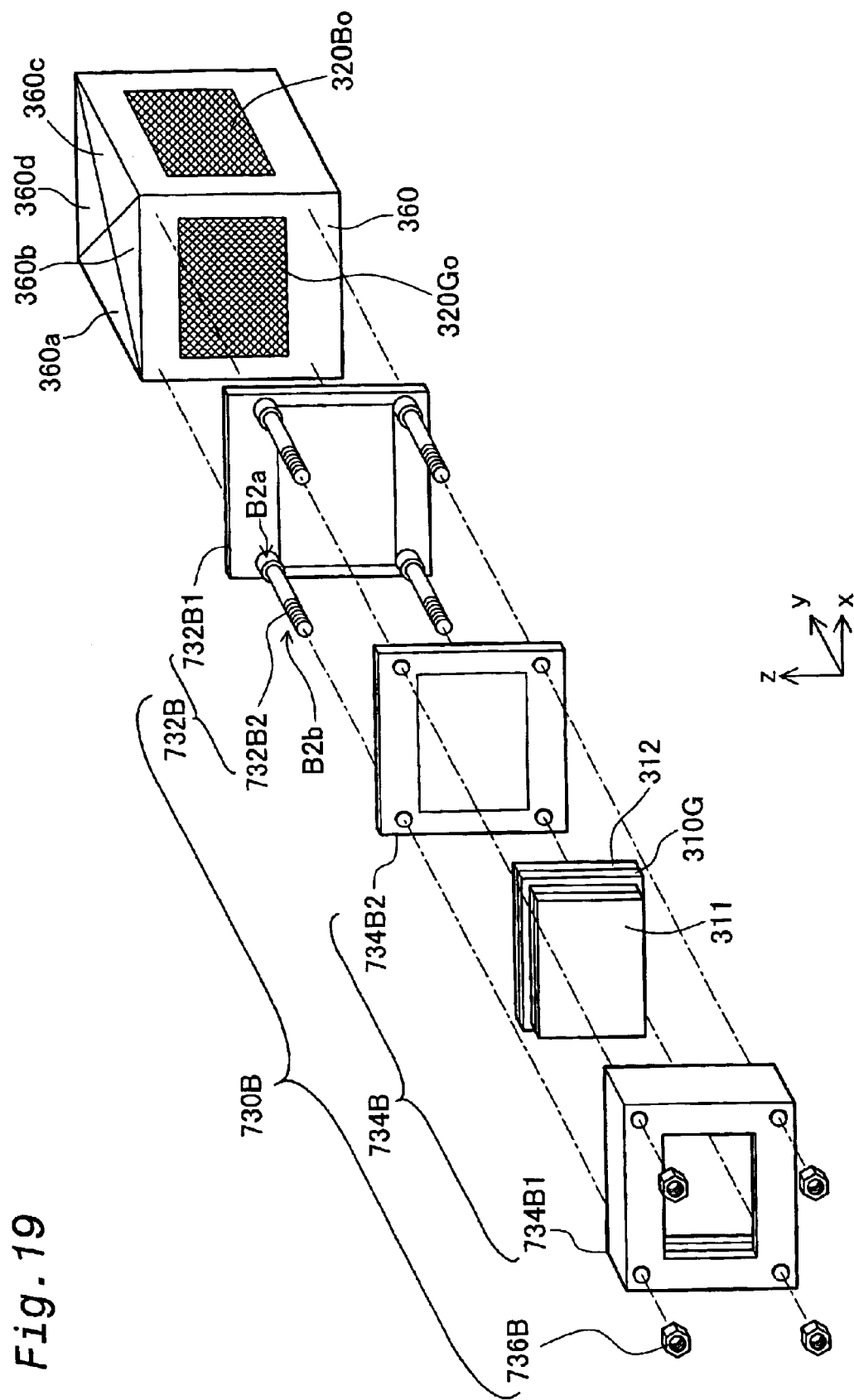
FIG. 19 is an explanatory diagram showing a third holder 730B that holds a third polarization control component, consisting of a liquid crystal panel 310G and a pair of light-transmissive substrates 311, 312 in the Sixth Embodiment.

FIG. 19 is an explanatory diagram showing a third holder 730B that holds a third polarization control component consisting of liquid crystal panel 310G and a pair of light-transmissive substrates 311, 312 in the Sixth Embodiment. The holder 730B comprises a metal fixing section 732B and an attaching section 734B.

The fixing section 732B comprises a frame portion 732B1 and column shaped portions 732B2 projecting up in proximity to the four corners of the frame portion 732B1. Each column shaped portion 732B2 has a first round column portion B2$a$ having a relatively large diameter, and a second round column portion B2$b$ having a relatively small diameter. Also, the distal end of each column shaped portion 732B2, more specifically, the distal end of each second round column portion B2$b$, has a male thread. The attaching section 734B comprises two partial attaching sections 734B1, 734B2. The first partial attaching section 734B1 is the same as the attaching section 734 of FIG. 9. The second partial attaching section 734B2 has a frame shape. At the four corners of the two partial attaching sections 734B1, 734B2, holes are provided having diameter smaller than the first round column portion B2$a$ of the column shaped portion 732B2, and larger than the second round column portion B2$b$.

The two partial attaching sections 734B1, 734B2 are joined sandwiching the third polarization control component 310G, 311, 312. Also, the column shaped portions 732B2 of the fixing section 732B are passed through the holes at the four corners of the attaching section 734B. After this, four attaching screws 736B are screwed onto the male threads at the distal ends of the column shaped portions 732B2 so as to join the fixing section 732B and the attaching section 734B. Then, the third holder 730B is fixed to the base frame 600 by means of sticking the holder 730B to the second right angle prism 360$b$ of the cross dichroic prism 360.

In this embodiment as well, the pair of light-transmissive substrates 311, 312 to which the liquid crystal panel 310G is stuck are held in a state of contact with the third holder 730B. Thus, heat generated by the liquid crystal panel 310G is transferred to the light-transmissive member 360$b$ formed of sapphire, via the light-transmissive substrates 311, 312 formed of sapphire and the metal holder 730B. The heat is then transferred to the metal base frame 600B via the light-transmissive members 360$a$–360$d$ formed of sapphire. In this way as well, as in FIG. 14, the temperature rise due to heat generation of the liquid crystal panel 310G can be reduced.

Figure 20:
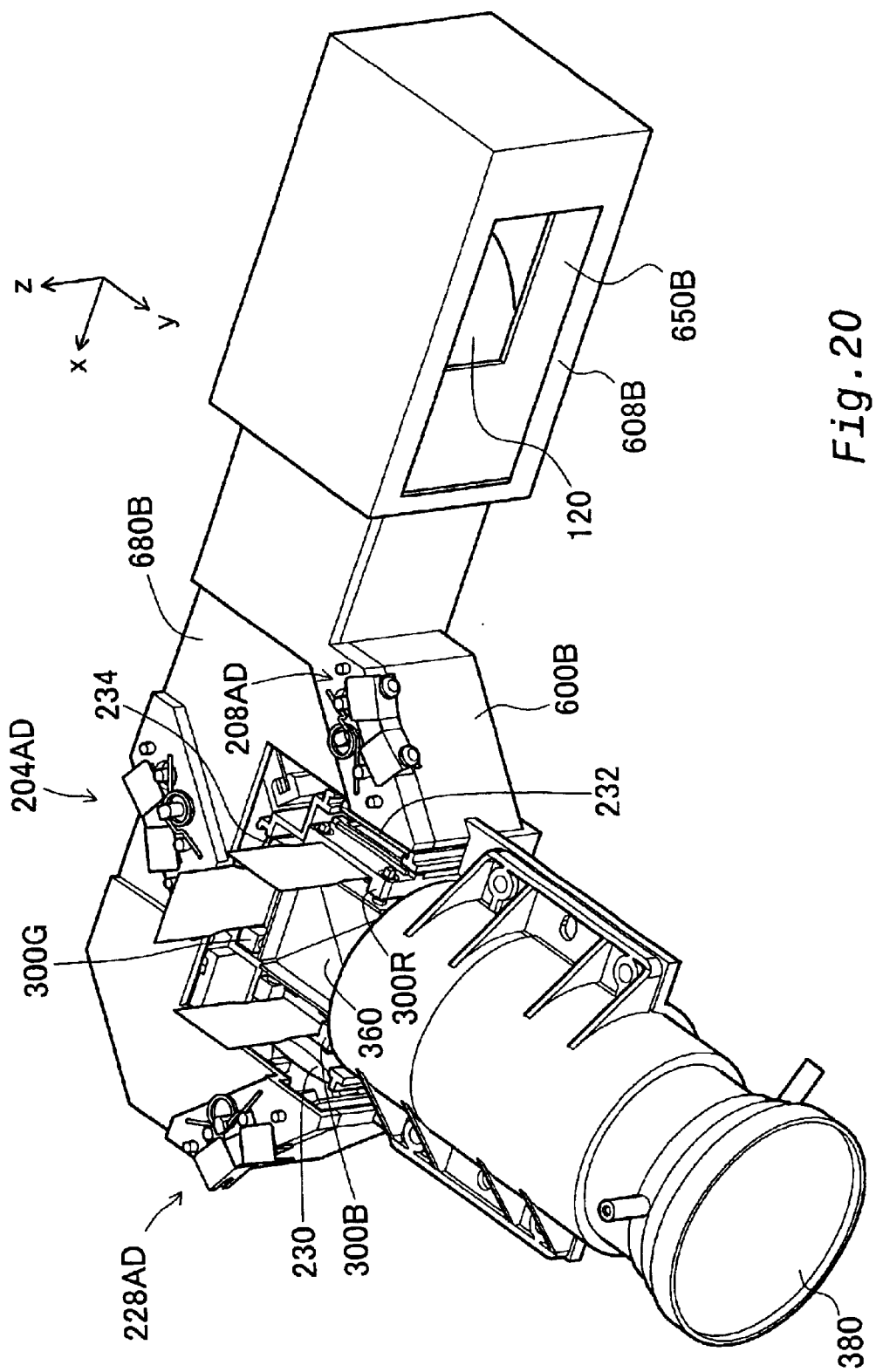
FIG. 20 is a perspective diagram showing the situation in which a base frame cover 680B is attached to the base frame 600B of FIG. 18.

FIG. 20 is a perspective diagram showing the situation in which a base frame cover 680B is attached to the base frame 600B of FIG. 18. The base frame cover 680B, like the base frame 600B, is integrally molded from metal material. As shown in the drawing, this base frame cover 680B is formed so as to cover the illumination optical system 100', the color separation optical system 200, and the relay optical system 220. To the upper face of base frame cover 680B are attached three mirror adjusting mechanisms 204AD, 208AD, 228AD that adjust the angles of three mirrors 204, 208, 228 situated closest to the three liquid crystal light valves 300R, 300G, 300B. Mirror adjusting mechanisms can also be provided so as to adjust the angles of other mirrors, for example, the dichroic mirrors 202 and the reflecting mirror 224.

Figure 21:
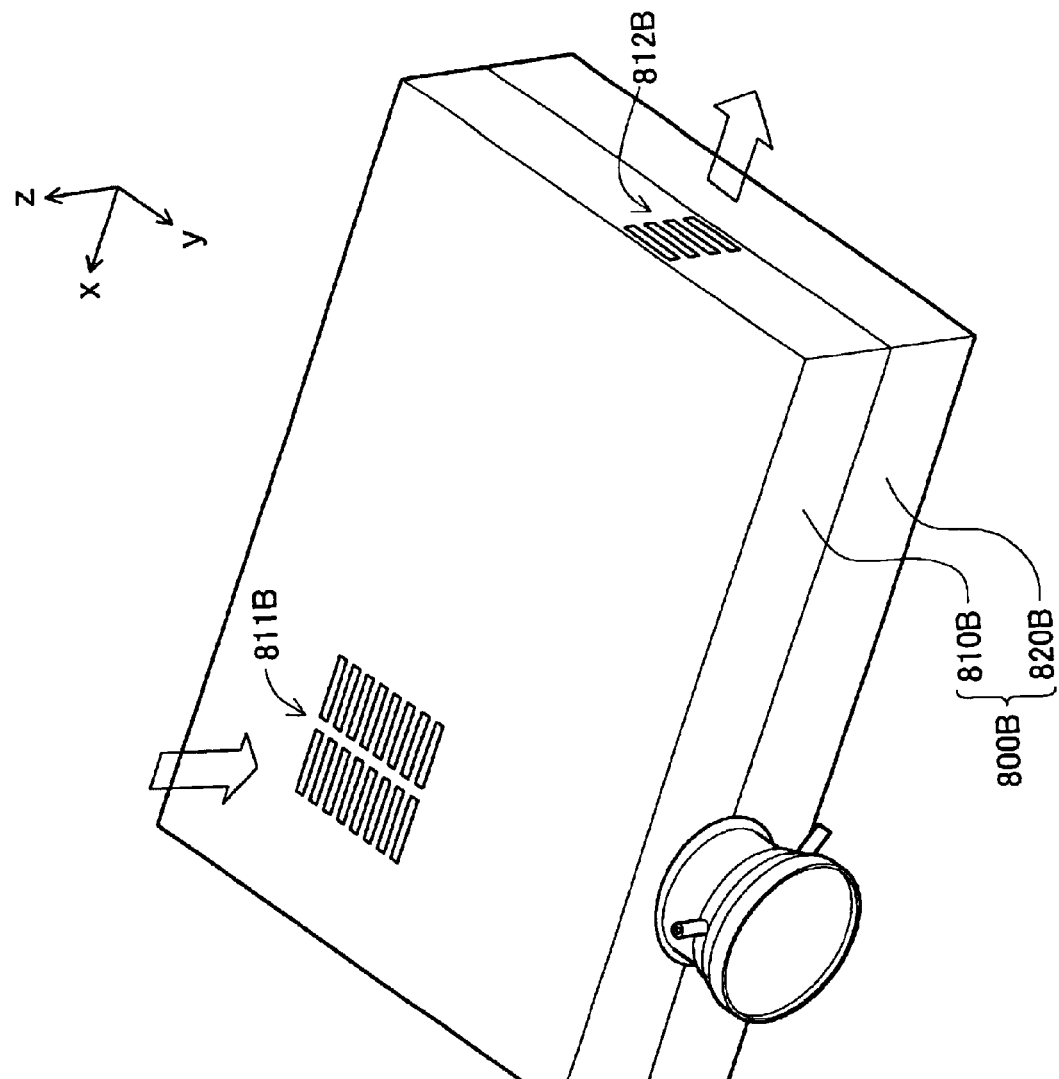
FIG. 21 is an explanatory diagram showing the outside of chassis 800B.

As shown in FIGS. 18 and 20, the optical components of the projector are mounted inside the base frame 600B and then housed in the chassis. FIG. 21 is an explanatory diagram showing the outside of chassis 800B. The chassis 800B comprises an upper chassis 810B and a lower chassis 820B, the upper chassis 810B and the lower chassis 820B each being integrally molded using metal material. Two sets of slit groups 811B, 812B are provided to the upper chassis 810B.

Figure 22:
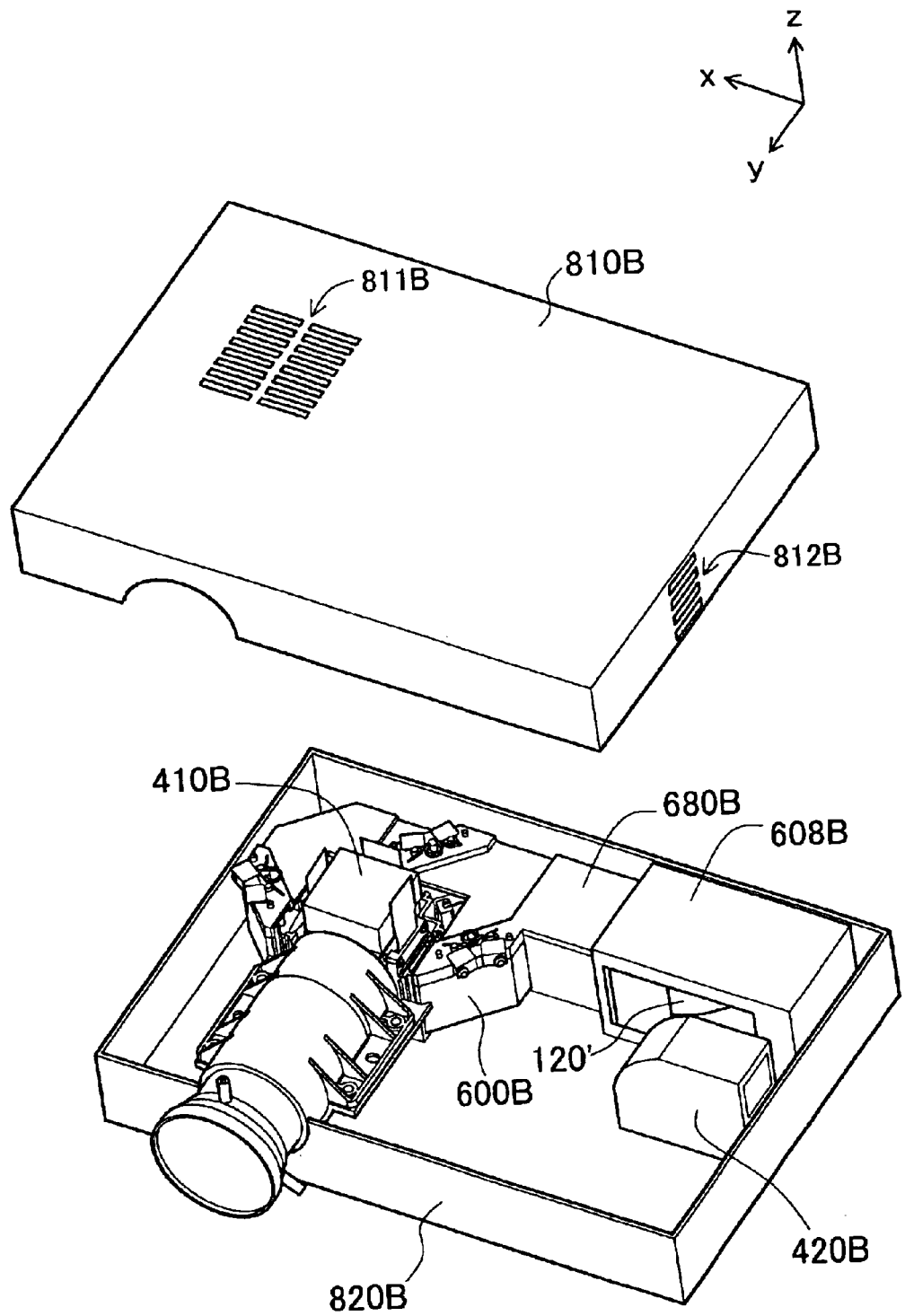
FIG. 22 is an explanatory diagram showing the condition of the interior of the chassis 800B shown in FIG. 21.

FIG. 22 is an explanatory diagram showing the condition of the interior of the chassis 800B shown in FIG. 21. Within the chassis 800B are housed the base frame 600B and two cooling fans 410B, 420B. Actually, the chassis 800B also houses a power supply section that supplies electrical power to the light source device 120', the liquid crystal light valves 300R, 300G, 300B, as well as a controller that controls these, and the like.

In this embodiment too, the metal base frame 600B, in the same manner as in the First Embodiment (FIG. 6), contacts a metal base frame 800B via a convex portions (connecting portions), not shown here, provided to the lower chassis 820B, and the base frame 600B and chassis 800B are thermally coupled. Because of this, heat generated by polarization control elements is transferred from the base frame 600B to the chassis 800B, as a result of which it is possible to further reduce the temperature rise due to heat generation of the polarization control elements.

The first cooling fan (axial fan) 410B is arranged above the cross dichroic prism 360 (FIG. 20). The first cooling fan 410B generates a breeze moving from the outside of chassis 800B to the inside through the first slit group 811B of the upper chassis 810B. The second cooling fan (sirocco fan) 420B is arranged so as to be next to the light source mounting section 608B on which the light source device 120' is mounted. The second cooling fan 420B generates a breeze moving from the inside of the chassis 800B to the outside through the second slit group 812B of the upper chassis 810B. That is, as shown in FIG. 21, the breeze introduced from the outside by the first cooling fan 410B is expelled to the outside by means of the second cooling fan 420B.

Figure 23:
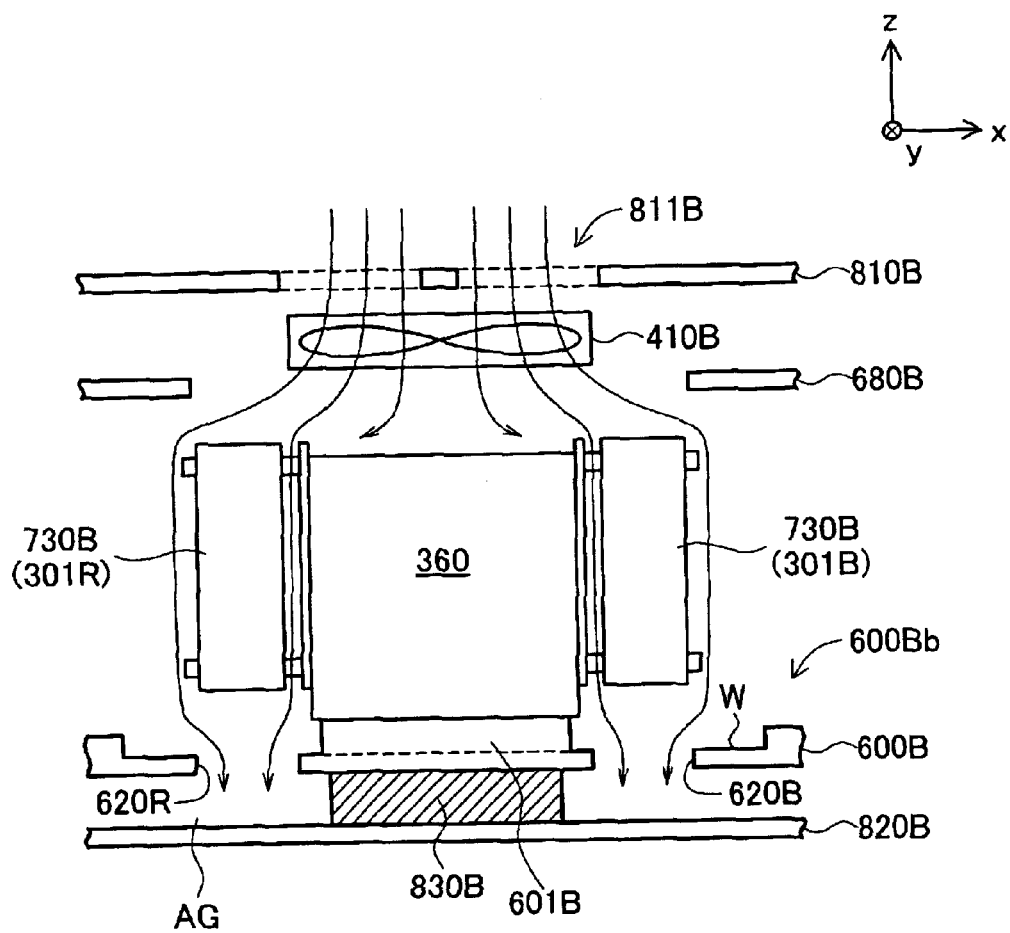
FIG. 23 is an explanatory diagram showing the situation around the first cooling fan 410B shown in FIG. 22.

FIG. 23 is an explanatory diagram showing the situation around the first cooling fan 410B shown in FIG. 22. FIG. 23 shows a schematic cross sectional view when the proximity of the first slit group 811B shown in FIG. 21 is cut in a plane parallel to the xz direction. The cross dichroic prism 360 is mounted on the convex portion 601B (FIG. 17) provided on the inside face of the bottom portion 600Bb of the base frame 600B. To the side face of the cross dichroic prism 360 is stuck the holders 730B (FIG. 19) that holds the three liquid crystal panels 310R, 310G, 310B, in a state with a predetermined gap provided.

As shown in FIG. 23, in this embodiment, between the base frame 600B and the lower chassis 820B, thermal conductive rubber 830B is arranged so as to contact both the base frame 600B and the lower chassis 820B. Thermal conductive rubber 830B is arranged below the convex portion 601B on which the cross dichroic prism 360 is mounted, and heat transferred from the cross dichroic prism 360 to the base frame 600B is transferred to the chassis 800B via the thermal conductive rubber 830B. Even using the thermal conductive rubber in this way, the metal base frame 600B and the metal chassis 800B can be thermally coupled. As the thermal conductive rubber 830B, a metal powder of relatively high thermal conductivity (for example, aluminum oxide or boron nitride, etc.) is added to silicone rubber can be used.

The first cooling fan 410B is arranged above the cross dichroic prism 360 by means of a holder (not shown). The breeze introduced by the first cooling fan 410B passes through the vicinity of the cross dichroic prism 360 and is drawn into holes 620R, 620G, 620B (FIG. 17) provided in the bottom portion of the base frame 600B. When this happens, polarization control components including the liquid crystal panels 310R, 310G, 310B, and the holders 730B holding the liquid crystal panels 310R, 310G, 310B, are air cooled, so that it is possible to further prevent the temperature rise due to heat generation of the liquid crystal panels. The breeze drawn into holes 620R, 620G, 620B is then led into an air passage AG provided in the bottom portion of the base frame 600B.

Figure 24:
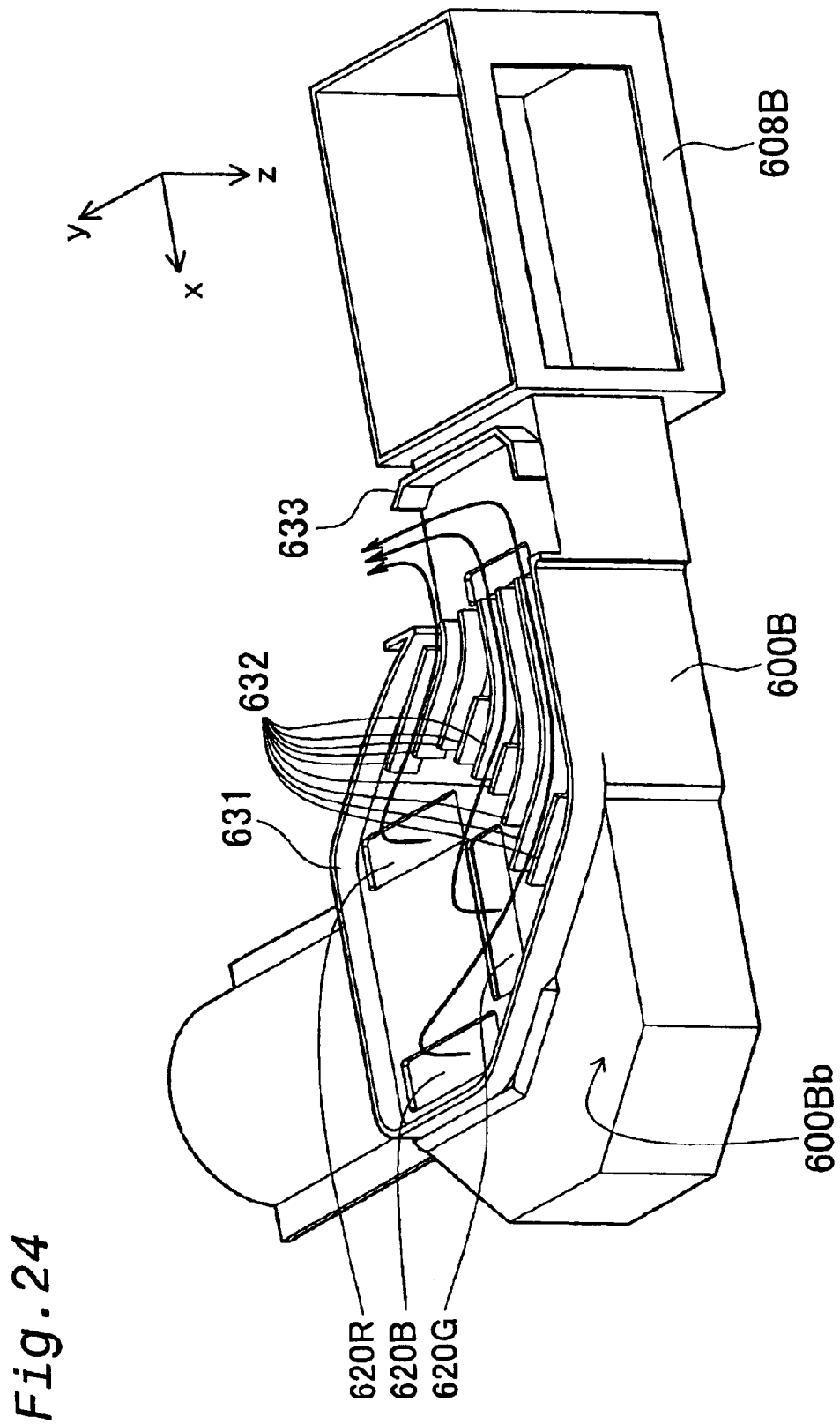
FIG. 24 is an explanatory diagram showing the outside face of the bottom portion of base frame 600B.

FIG. 24 is an explanatory diagram showing the outside face of the bottom portion of the base frame 600B. As shown in the drawing, a plurality of cooling fins 631-633 are provided on the outside face of the bottom portion 600Bb of the base frame 600B. The first cooling fin 631 is provided so as to enclose the area in which the cross dichroic prism 360, the liquid crystal light valves 300R, 300G, 300B, and the color separation optical system 200 shown in FIG. 18 are mounted. The plurality of second cooling fins 632 are provided along a direction facing from the cross dichroic prism 360 towards the illumination optical system 100' shown in FIG. 18. The third cooling fin 633 is arranged so as to lie along the y-direction in proximity to the location where the parallelizing lens 126 of the illumination optical system 100' shown in FIG. 18 is mounted. Also, the distal ends of the cooling fins 631–633 have widths such that when the base frame 600B is housed inside the lower chassis 820B (FIG. 22), the bottom portion of the lower chassis 820B is contacted. By means of the first and third cooling fins 631, 633, an air passage AG shown in FIG. 23 is constituted, between the base frame 600B and the lower chassis 820B.

Breeze guided onto the outside face of the bottom portion 600Bb of the base frame 600B via holes 620R, 620B, 620B advances through the area enclosed by the first and third cooling fins 631, 633 (i.e., air passage AG), along the second cooling fin 632. Then, the breeze reaching the proximity of the third cooling fin 633 is guided to the +y direction by means of the second cooling fan 420B (FIG. 22). After that, the breeze in the air passage AG is expelled to outside the chassis 800B by means of the second cooling fan 420B.

In this way, by providing cooling fins 631–633, as in the First Embodiment (FIG. 6), the base frame 600B can be cooled efficiently. Also, in this embodiment, by providing a plurality of second fins 632, a plurality of flow passages are formed. Thus, the breeze passing through air passage AG does not readily develop turbulent flow, and as a result of this, it is possible to even more efficiently cool the base frame 600B.

By the way, in this embodiment, an oxide film is formed on the outside face of the metal (for example, Mg alloy or Al alloy) base frame 600B. The oxide film can be formed, for example, by anodic oxidation process. By forming an oxide film, heat of the base frame 600B can be transferred efficiently to the chassis 800B. That is, in the case where a base frame 600B with an oxide film formed on the outside face is used, the radiation rate is higher than compared to the case of using a metal base frame as-is. Here, radiation rate means the ratio $\epsilon$ (E/E') where the total radiant energy of a hypothetical black body is designated E' and the total radiant energy of an object is designated E, and ratio $\epsilon$ can assume a value of from 0 to 1. By increasing the radiation rate of the base frame 600B, the temperature of the base frame 600B can be made relatively low, so the temperature rise due to heat generation of polarization control elements can be further reduced.

In this embodiment, the outside face of chassis 800B (FIG. 22) also has an oxide film formed. Because of this, heat of the chassis 800B can be efficiently emitted to the outside, and as a result it is possible to further reduce the temperature rise due to heat generation of polarization control elements.

In this embodiment, the outside faces of the base frame 600B and the chassis 800B have oxide film formed on them, but instead of this, other film could be formed. For example, metal having higher radiation rate than the metal making up the base frame 600B and the chassis 800B could be plated onto the outside faces of the base frame 600B and the chassis 800B.

Generally, films for increasing radiation rate will be formed on the outside faces of the base frame 600B and the chassis 800B.

In this embodiment, the outside face of the chassis 800B has an oxide film formed on it, but instead of this, a film including resin material could also be formed. As such film, there may be used, for example, a film of a polyester resin layer and an epoxy resin layer and an acrylic resin layer stacked in this order on the chassis 800B can be used. By so doing, the temperature felt when a person touches the outside face of the chassis 800B can be made relatively low. Also, in the above example, by using a film having suitable coloring matter (e.g. dye) added to the uppermost acrylic resin layer, it is possible to increase the radiation rate of the chassis 800B.

Figure 25:
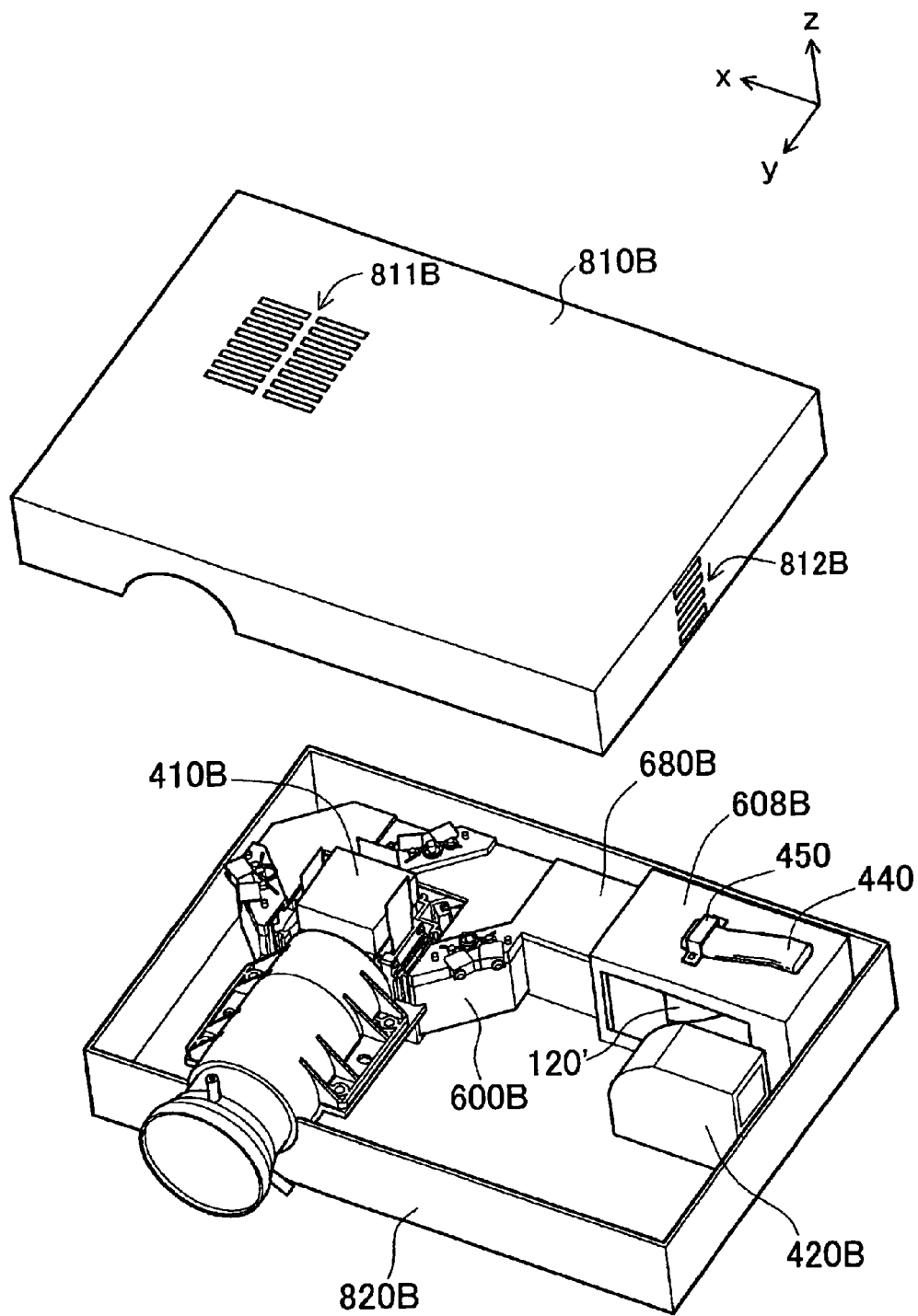
FIG. 25 is an explanatory diagram showing the conditions inside the chassis 800B in the Seventh Embodiment.

G. Seventh Embodiment:

FIG. 25 is an explanatory diagram showing conditions inside the chassis 800B in the Seventh Embodiment. The projector of this embodiment is substantially the same as the Sixth Embodiment (FIG. 22), but on the metal light source mounting section 608B, a heat pipe 440 is provided. The heat pipe 400 is fixed onto the metal light source mounting section 608B by means of a metal fixing section 450.

Figure 26:
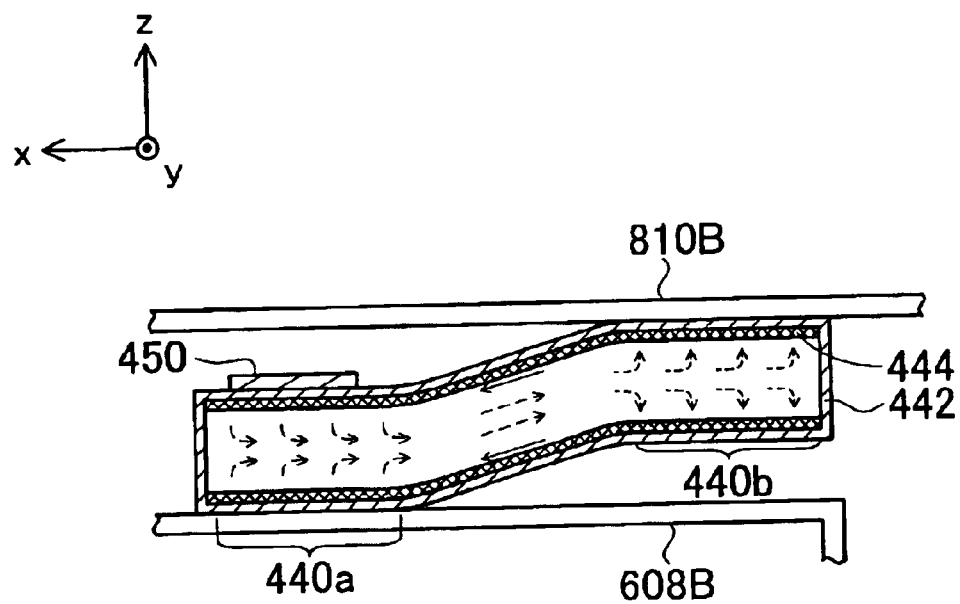
FIG. 26 is a schematic cross sectional view when the proximity of heat pipe 400 shown in FIG. 25 is cut in a plane parallel to the xz plane.

FIG. 26 is a schematic cross sectional view when the proximity of the heat pipe 400 shown in FIG. 25 is cut in a plane parallel to the xz plane. The heat pipe 440 is comprised of a pipe 442, a wick 444 provided to the inside wall of the pipe 442, and a working fluid sealed inside the pipe 442. The pipe 442 is formed of metal material of relatively high thermal conductivity such as aluminum or copper. As the wick, for example, a porous member or mesh-like member is used. It should be noted that a groove may be formed on the inside wall of the pipe, and it is possible to use this as the wick. As the working fluid, for example, water methanol may be used.

The heat pipe 440 is shaped such that a first end portion 440a thereof contacts the upper portion of the light source mounting section 608B and a second end portion 440b thereof contacts the upper chassis 810B. The first end portion 440a functions as an evaporating portion and the second end portion 440b functions as a condensing portion. That is, working fluid, in the first end portion 440a, absorbs heat from the light source mounting section 608B and then evaporates. The vapor, in the second end portion 440b, releases heat to the upper chassis 810B and condenses. The working fluid condensed in the second end portion 440b moves by means of capillary action through the wick 444, and returns to the first end portion 440a.

In the way described above, the heat pipe 440 is an electrothermal element using latent heat during evaporation and during condensing of working fluid. Thermal conductivity of the heat pipe differs depending on the material forming the pipe, working fluid etc., but, for example, it has a thermal conductivity about 80 times that of a copper rod. Accordingly, by providing the heat pipe 440 on light source mounting section 608B, heat of the light source mounting section 608B can be transferred efficiently to the upper chassis 810B, and as a result, heat of the light source mounting section 608B can be efficiently released to the outside.

The heat pipe 440 of this embodiment is arranged so as to thermally couple the base frame 600B and the chassis 800B, but it is also possible to do this with the second end portion 440b of the heat pipe 440 not contacting the upper chassis 810B. It can be done, for example, with the second end portion 440b arranged in proximity to the air inlet or outlet of second cooling fan 420B. Also, in this embodiment, the heat pipe 440 is arranged on the light source mounting section 608B, but instead of this, or in addition to this, it may be arranged in proximity to the polarization control elements. By so doing, the temperature rise due to heat generation of polarization control elements can be further reduced. Generally, a projector will comprise a heat pipe.

The present invention is not restricted to the above embodiment or its modifications, but there may be many other modifications, changes, and alterations without departing from the scope or spirit of the main characteristics of the present invention. Some examples of possible modification are given below.

(1) In the First through Fifth Embodiments (FIG. 6, FIG. 15), cooling fin 610 is provided to the bottom face of the bottom portion of base frame 600, and the breeze from cooling fan 420, by hitting cooling fin 610, efficiently cools the base frame 600. Also, in the Sixth and Seventh Embodiments (FIG. 24), cooling fins 631–663 are provided to the bottom face of the bottom portion of the base frame 600B, and the breeze from cooling fan 410B, by hitting the cooling fins 631–663, efficiently cools the base frame 600B. However, the cooling fans 420, 410B may be omitted in cases where installation thereof is difficult. In this case as well, the base frame can be cooled by means of a cooling fin, so heat generated by polarization control elements can be efficiently transferred to the base frame, and the temperature rise due to the heat generation of polarization control elements can be reduced. In the above embodiments, the cooling fin is provided to the bottom face (outside face) of the bottom portion of the base frame, but could be provided to the outside face of a side portion.

Generally, it is preferable that a cooling fin is provided to the outside face of the base frame on which a plurality of optical components are mounted.

(2) In the above embodiments, light-transmissive members constituting polarization control components are formed of sapphire, but instead of this can be formed of glass with silicon dioxide as its principal component. In this case as well, heat generated by polarization control elements can be transferred to the light-transmissive members and the base frame, and as a result, the temperature rise due to heat generation of polarization control elements can be reduced. Generally, a light-transmissive member will have thermal conductivity of at least about 0.8 W/(m·K).

(3) In the First through Fourth Embodiments, optical components are held by separately prepared holders 710, 720, 730, 750, 790, and in the Fifth through Seventh Embodiments, a plurality of optical components are held by common holders 701, 701B. In this way, in the above embodiments, optical components are held by holders, but the holders can be omitted. That is, convex portions and/or concave portions can be provided on the inside of the base frame such those as formed on the inside of the common holder 701 of FIGS. 16(A) and 16(B), and these can be utilized to mount the optical components inside the base frame.

(4) In the above embodiments, the base frame 600, 660B is formed of metal material such as Mg alloy, Al alloy etc., but could instead be formed of resin material with metal material (metal powder) of relatively high thermal conductivity added. In this case as well, relatively high thermal conductivity of at least about 10 W/(m·K) can be obtained. For example, a BMC (bulk molding compound) with added aluminum oxide ($Al_2O_3$) can be used. BMC is a composite material of unsaturated polyester or other thermosetting resin reinforced with glass staple fibers. Doing so has the advantage of forming a lighter weight projector, compared to case of forming the base frame of metal material only. However, when a base frame formed of metal material only (i.e., a metal base frame) is used, as in the above embodiments, thermal conductivity of the base frame can be made relatively high. This has the advantage of further reducing temperature rise due to heat generation of polarization control elements.

Generally, the base frame for mounting the plurality of optical components arranged on the optical path from the illumination optical system to the projection optical system will be formed of materials including metal material.

(5) In the above embodiments, by means of mutual contact of a base frame and a light-transmissive member with polarization control elements stuck to it, or, by means of interposing a member of relatively high thermal conductivity contacting both a base frame and a light-transmissive member, a base frame and a light-transmissive member are thermally coupled. In the latter case, instead of a holder, or, in addition to a holder, a sheet of relatively high thermal conductivity (thermal conductive sheet) can be used. Specifically, by means of contacting a thermal conductive sheet with both a light-transmissive member and a base frame, a light-transmissive member and a base frame can be thermally coupled. In this case, since the light-transmissive member and the base frame are thermally coupled by means of a thermal conductive sheet, the holder can be formed of materials of thermal conductivity lower than metal materials (for example, resin material with the aforementioned metal material added). Also, as a thermal conductive sheet there may be a sheet made of graphite, a sheet made of metal etc. PGS Graphite Sheet (trademark) made by Matsushita Electronic Components Co., Ltd. may be used, for example, as a graphite sheet Generally, the base frame and the light-transmissive member with polarization control elements stuck to it will be thermally coupled.

(6) In the First through Fifth Embodiments (FIG. 6, FIG. 15), the base frame and chassis are connected via convex portions (connectors) 826, 827, 829 that attach the base frame onto the chassis. In the Sixth and Seventh Embodiments, the thermal conductive rubber 830B is arranged between the base frame and chassis. Instead of thermal conductive rubber, there could be arranged the aforementioned thermal conductive sheet. Furthermore, the Seventh Embodiment, a heat pipe 440 is arranged between the base frame and chassis. By so doing, heat of the base frame 600B can be efficiently transferred to the chassis 800B. Generally, the base frame and chassis will be thermally coupled.

(7) The above embodiments regard application of the present invention to the transmissive-type projector. The principle of the present invention is also applicable to reflective-type projectors. In the 'transmissive-type' projector, the electro-optical device working as the light modulation means allows transmission of light, for example, in a transmissive-type liquid crystal panel. In the 'reflective-type' projector, on the other hand, the electro-optical device working as the light modulation means reflects light, as for example, in a reflective-type liquid crystal panel. Application of the present invention to the reflective-type projector ensures the similar advantages to those attained by application to the transmissive-type projector.

(8) In the above embodiments, the projector 1000 uses the liquid crystal panels as the electro-optical devices, but may instead use micromirror-type light modulation devices. A typical example of the micromirror-type light modulation device is the DMD (Digital Micromirror Device) (trade mark by Texas Instruments Incorporated). In general, any electro-optical device that modulates incident light in response to image information is applicable.

(9) The above embodiments regard the projector 1000 that displays color images. The present invention is also applicable to projectors that displays monochromatic images.

INDUSTRIAL APPLICABILITY

This invention is applicable to a projector that projects and displays images.

What is claimed is:

1. A projector, comprising:
   an illumination optical system including a light source device;
   an electro-optical device for modulating light from the illumination optical system in response to image information;
   a projection optical system for projecting modulated light obtained with the electro-optical device; and
   a base frame, formed using material including metal material, for mounting all optical components arranged on an optical path from the illumination optical system to the projection optical system excluding the light source device,
   wherein at least one of the optical components is a polarization control component comprising:
   a polarization control element including organic material for controlling polarization state of light exiting from the polarization control element; and
   a light-transmissive member having a thermal conductivity of at least about 0.8 W/(m·K), to which the polarization control element is stuck,
   and wherein the light-transmissive member and the base frame are thermally coupled.

2. The projector according to claim 1 wherein the light-transmissive member has a thermal conductivity of at least about 5.0 W/(m·K).

3. The projector according to claim 2 wherein the base frame is made of metal.

4. The projector according to claim 3 wherein the polarization control component is held by a metal holder that contacts the light-transmissive member,
   and the light-transmissive member and the base frame are thermally coupled via at least the holder.

5. The projector according to claim 4 wherein the holder is fixed to the base frame via an adhesive sheet.

6. The projector according to claim 4 wherein the holder is fixed to the base frame via adhesive.

7. The projector according to claim 4 wherein the holder is fixed to the base frame by metal welding.

8. The projector according to claim 4 wherein the light-transmissive member is fixed to the holder via an adhesive sheet.

9. The projector according to claim 4 wherein the light-transmissive member is fixed to the holder via adhesive.

10. The projector according to claim 4 wherein the holder comprises:
    a fixing section fixed to the base frame; and
    an attaching section for attaching the light-transmissive member to the fixing section,
    wherein the fixing section is fixed to the base frame via an adhesive sheet.

11. The projector according to claim 4 wherein the holder comprises:

a fixing section fixed to the base frame; and an attaching section that attaching the light-transmissive member to the fixing section, wherein the fixing section is fixed to the base frame via adhesive.

12. The projector according to claim 4 wherein the holder comprises:

a fixing section fixed to the base frame; and an attaching section for attaching the light-transmissive member to the fixing section, wherein the fixing section is fixed to the base frame by metal welding.

13. The projector according to claim 4 wherein the holder comprises:

a fixing section fixed to the base frame; and an attaching section for attaching the light-transmissive member to the fixing section, wherein the light-transmissive member is stuck to at least one of the fixing section and the attaching section via an adhesive sheet.

14. The projector according to claim 4 wherein the holder comprises:

a fixing section fixed to the base frame; and an attaching section for attaching the light-transmissive member to the fixing section, wherein the light-transmissive member is stuck to at least one of the fixing section and the attaching section via adhesive.

15. The projector according to claim 3 further comprising a metal chassis for housing all optical components arranged on the optical path from the illumination optical system to the projection optical system, wherein the base frame and the chassis are thermally coupled.

16. The projector according to claim 3, wherein the light source device and the base frame are thermally insulated.

17. The projector according to claim 16 wherein a thermal insulating member is arranged between the light source device and the base frame.

18. The projector according to claim 3 further comprising a cooling fin, provided on the outside face of the base frame.

19. The projector according to claim 3 wherein a film for raising radiation rate is formed on the outside face of the base frame.

20. The projector according to claim 15 wherein a film for raising radiation rate is formed on the outside face of the chassis.

21. The projector according to claim 3 wherein the polarization control element is a liquid crystal panel, which functions as the electro-optical device.

22. The projector according to claim 3 wherein the polarization control element is a polarizing plate.

23. The projector according to claim 3 wherein the polarization control element is a retardation plate.

24. The projector according to claim 3 wherein the light-transmissive member is a lens.

25. The projector according to claim 3 wherein the polarization control component further comprises a lens, the lens being provided on the light-transmissive member of plate shape.

26. The projector according to claim 25 wherein the lens is formed of plastic.

27. The projector according to claim 3 wherein the light-transmissive member is a sapphire member.

28. The projector according to claim 3 wherein the light-transmissive member is a rock crystal member.

* * * * *